United States Patent [19]

Gordon

[11] Patent Number: 4,659,448
[45] Date of Patent: Apr. 21, 1987

[54] SOLID STATE ELECTROCHEMICAL POLLUTION CONTROL DEVICE

[75] Inventor: Arnold Z. Gordon, Lyndhurst, Ohio

[73] Assignee: IGR Enterprises, Lyndhurst, Ohio

[21] Appl. No.: 796,879

[22] Filed: Nov. 12, 1985

[51] Int. Cl.[4] .................. C25B 9/00; C25B 15/08
[52] U.S. Cl. .................. 204/277; 204/278; 204/427; 204/428
[58] Field of Search .............. 204/277, 278, 130, 265, 204/266, 427, 428

[56] References Cited

U.S. PATENT DOCUMENTS

| | | | |
|---|---|---|---|
| 3,216,911 | 11/1965 | Kronenberg | 204/278 X |
| 3,400,054 | 9/1968 | Ruka et al. | 204/130 X |
| 3,650,920 | 3/1972 | Hickam et al. | 204/130 |
| 4,128,433 | 12/1978 | Manning | 204/427 X |
| 4,174,260 | 11/1979 | Schmidberger | 204/266 X |
| 4,477,541 | 10/1984 | Fraioli | 204/277 X |
| 4,505,790 | 3/1985 | Mase et al. | 204/130 |

Primary Examiner—Donald R. Valentine
Attorney, Agent, or Firm—Niblack & Niblack

[57] ABSTRACT

A solid state electrochemical ceramic cell adapted to alter the composition of gas exhaust streams containing noxious component passing therethrough comprising: a porous, high surface area body having a gas-receiving first end seal portion, a gas egressing second end seal portion and substantially gas impervious side walls defining the length of the cell; a high surface area, porous solid electrolyte forming the body of the cell interior; a gas communicating passageway through the cell length extending from the first seal end portion through the second seal end portion and adapted to carry gas through the length of the cell; a first electronically conductive region and a second electronically conductive region, said regions disposed in electronically opposing segment of the cell; a first electrode connection member located in said first conductive region and a second opposing electrode connection member located within said second conductive region; said end seal portions adapted to be positioned in gas-tight engagement with conduit means which deliver and remove a gas stream to be treated to and from the cell.

29 Claims, 24 Drawing Figures

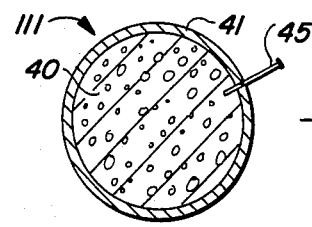
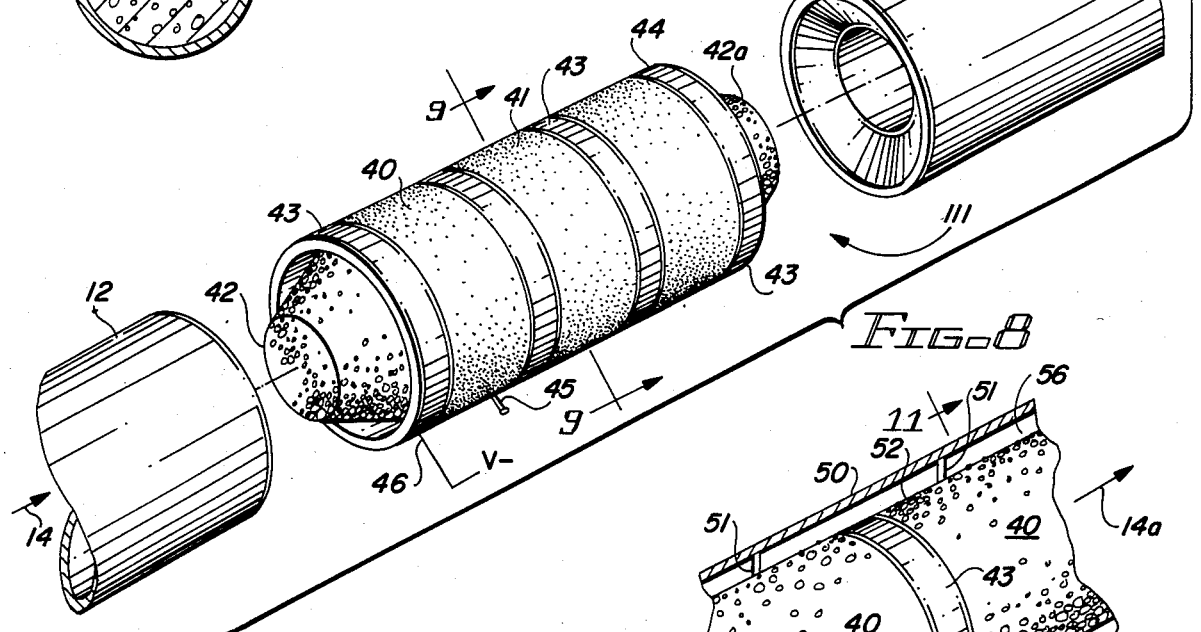
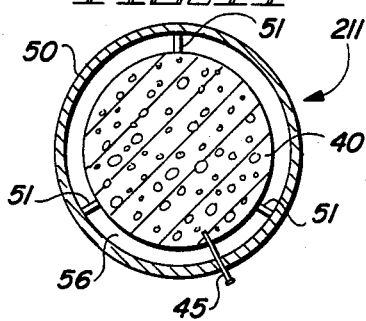
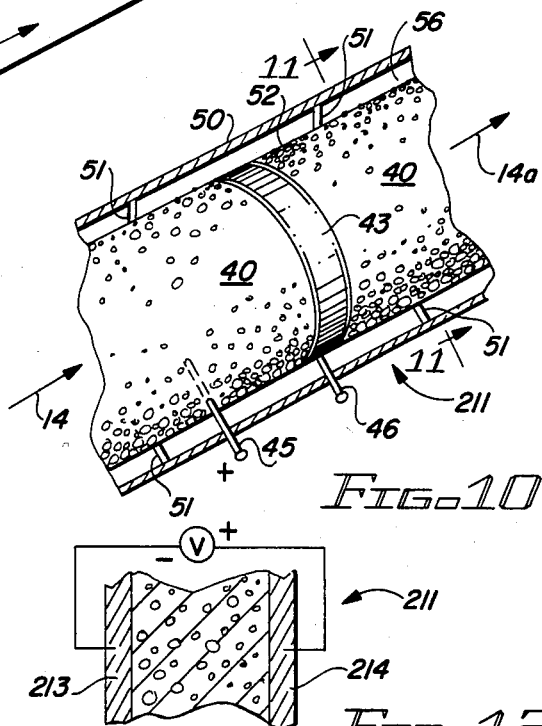
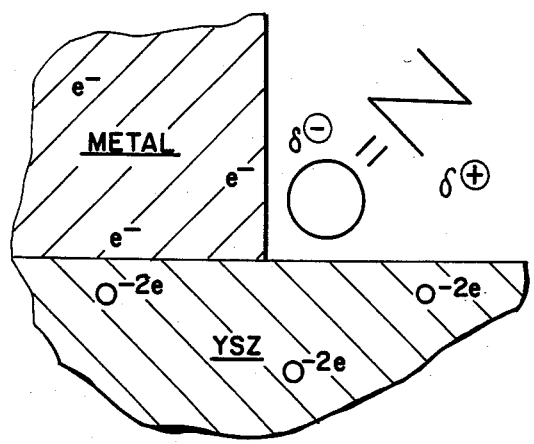
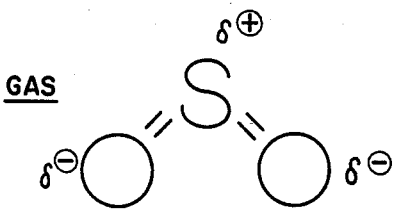
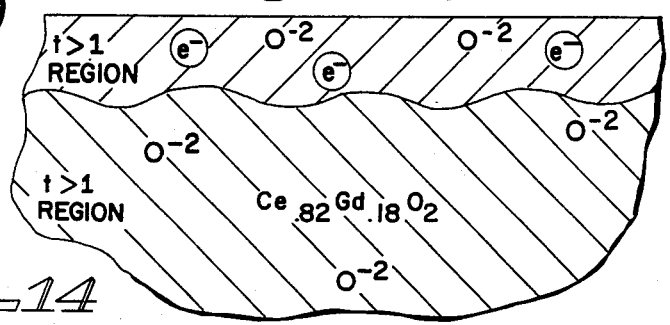

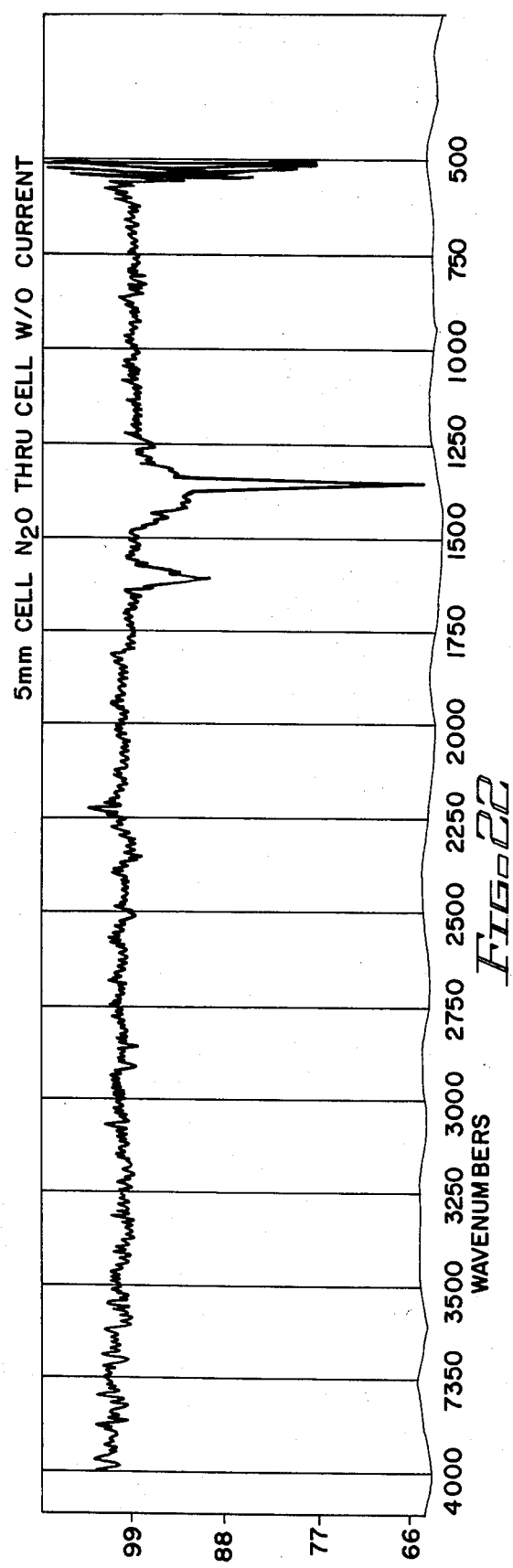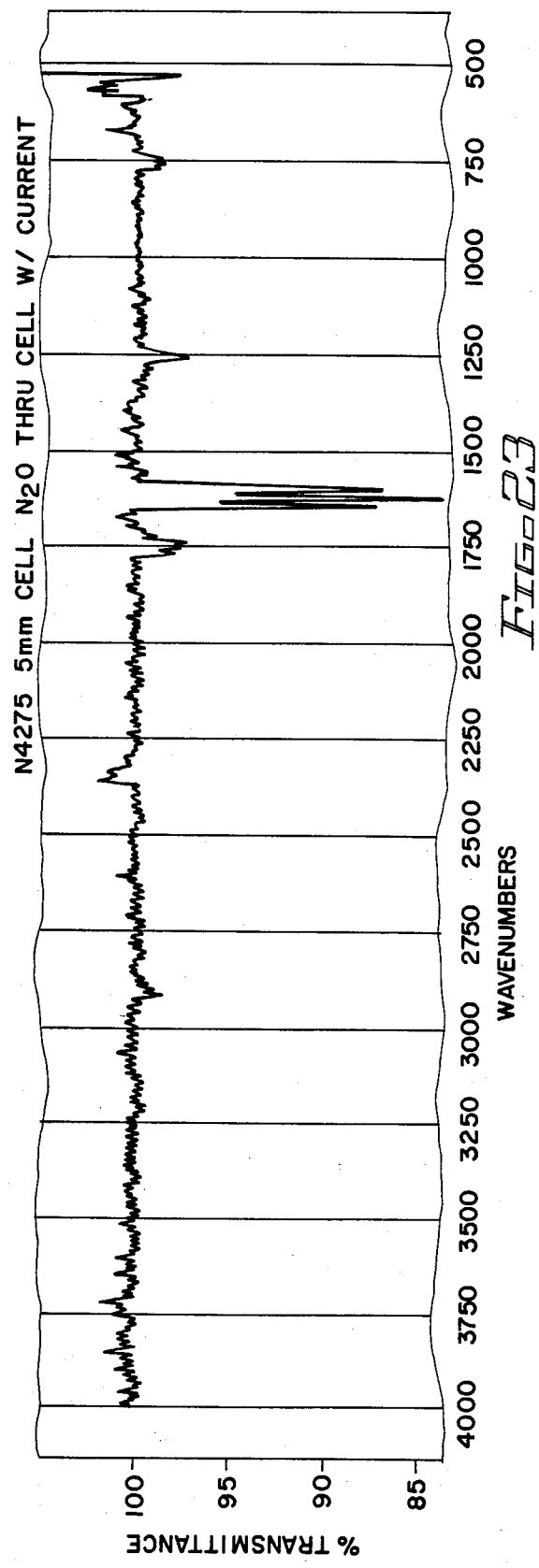

SOLID STATE ELECTROCHEMICAL POLLUTION CONTROL DEVICE

BACKGROUND OF THE INVENTION

A. Field of the Invention

The present invention relates to solid-state electrochemical gas composition control assemblies, and more particularly relates to a novel air pollution scrubber assembly for removing sulfur oxide(s) and nitrogen oxide(s) emissions from fluid streams such as from vehicular exhaust, mining, refining, industrial and manufacturing emissions, fossil fuel powered plants, flue gas, tail gas, industrial boilers, glass furnaces, natural gas driven compressors, gas turbines, catalytic cracking regenerators and the like.

Acid rain is conservatively estimated to cause more than 5 billion dollars in damages annually to crops, forests and lakes in the eastern United States alone. In 1983, the Interagency Task Force on Acid Precipitation issued its first report which clearly identified sulfur dioxide and nitrogen oxides as causal agents of acid rain.

Acid rain forms when sulfur and nitrogen oxides are converted into sulfates and nitrates in the atmosphere. Through a process known as scavenging, rainfall cleanses the atmosphere below rain clouds, removing sulfates and nitrates along with dust particles, and causing acid precipitation. In addition, when moisture in clouds coalesces to form raindrops and snowflakes, it will often do so around the nuclei of nitrate and sulfate particles. As a result of these phenomena, pollution-laden air masses capable of traveling great distances in short periods of time, can very rapidly dump massive quantities of acids in a heavy rainfall.

U.S. utilities account for more than 65% of the sulfur dioxide and 31% of the nitrogen oxide released to the atmosphere. Coal burning is the source of approximately 90% of the sulfur dioxide emissions and over 50% of the $NO_x$ (NO, $NO_2$) emissions. Motor vehicles contribute approximately 40% of the man made $NO_x$ emissions in the United States.

The problem is not confined to the United States. Sweden imposed stringent controls after seeing 18,000 of its lakes acidified. Greece has imposed unprecedented restrictions on the use of automobiles in Athens and has forced major industrial plants to shut down during the summer months. Alarmed by government reports describing damage to 14 million acres of forests, nearly 8% of the nation's forest area, the German Interior Ministry implemented a sweeping "big furnace" ordinance, under which flue-gas desulfurization will become mandatory for nearly all furnaces with at least 100-MW thermal capacity.

Of even broader impact, the Brussels-based European Community Commission approved a directive in April of 1983 designated to control air pollution from industrial sources in Common Market countries. Under the directive, Common Market members can issue licenses to build and operate new facilities only if there would be no danger to health and no risk of major air pollution, and only if no existing Common Market or national air quality or emission standard were exceeded. The pollutants covered are $SO_2$, $NO_x$, heavy metals, carbon monoxide, and fluorides.

In addition to the well recognized dangers of acid rain, the principal exhaust products of vehicular exhaust, carbon monoxide, carbon dioxide, partially burned hydrocarbons, oxides of nitrogen (primarily NO), water and nitrogen, can combine in a large variety of ways in the atmosphere.

The photochemical reaction between oxides of nitrogen and hydrocarbons (HC) that caused the original interest in automobiles as a source of pollution has been extensively investigated. Ozone is a principal oxidant produced; however, comparatively low levels of some other ultimate products, such as peroxyacetyl nitrate, are apparently responsible for two unique effects of Los Angeles smog; plant damage known as silver leaf, and eye irritation.

The present invention is directed toward a gas composition control device which is highly effective in altering or removing volatile oxygen and/or hydrogen bearing compounds such as sulfur oxides and nitrogen oxides from fluid exhaust streams, such as from vehicular exhaust, stationary source exhaust, flue-gas and the like.

Conventional flue gas desulfurization (FGD) systems or so called "wet scrubbers" are the most expensive environmental control subsystem in a coal-fired power plant. For a new plant built today, the cost of a wet scrubber is exceeded only by the cost of the boiler itself. In a retrofit situation, the FDG cost may double. Maintenance costs are also high, ranging from 2 to 20 times higher than the rest of the plant.

These expensive systems employ an aqueous alkaline slurry, typically a lime or limestone slurry, which is sprayed on the flue gas coming from the boiler. The sulfur dioxide in the flue gas is absorbed and converted into calcium sulfite and/or calcium sulfate which is collected and disposed of.

Many FGD systems have proved to be very difficult to operate or entirely unsatisfactory. They either fail to capture the $SO_2$ emissions efficiently and reliably or they often become plugged and suffer severe corrosion. Nevertheless utilities will spend more than one billion dollars per year over the next decade for FGD equipment.

Because of the problems associated with the wet scrubbers, dry-scrubbing processes have been investigated. In such processes, a relatively dryer alkaline powder is injected directly into the flue gas stream. The alkaline particles react with $SO_2$ while suspended in the gas stream. Dry waste is subequently collected in a particulate collection device (baghouse, precipitator, etc.) and the scrubbed flue gas is vented to the atmosphere. While the reactivity of dry scrubbing agents is lower than the reactivity of wet-sorbent scrubbing processes, the dry-scrubbing processes have a number of advantages. The relative absence of water minimizes cost, corrosion, erosion and freezing problems. Further, $SO_2$ and dry particulates are controlled in a single piece of equipment. Projected capital costs are expected to be anywhere from 30 to 50% lower than wet scrubber or spray drier systems, although operating costs are expected to be equivalent. And finally, the dry-scrubbing process eliminates both the reheating requirements and high pressure drop conditions, thus resulting in a 3-5% energy savings based on plant energy.

Despite the expense and problems associated with the wet-scrubber lime and limestone systems, they continue to account for more than 90% of the utility FGD commitments, since they are usually the lowest cost flue gas desulfurization system to buy and operate, and there is a base of utility operating experience with them.

However, increasing regulatory pressures have spurred the evolution and development of several advanced flue gas desulfurization which are intended to overcome one or more of the technical, economic or reliability impediments inherent in the older FGD approaches. Despite these advances, the expense and problems of reliability and efficiency place even the most advanced wet scrubber systems in the category of an interim solution.

The present invention fulfills the long-standing need for more effective technology in the field of flue gas desulfurization. The present invention is also applicable to, for example, effectively reducing the $NO_x$ emissions from stationary sources or from industrial manufacture and vehicular sources such as vehicular (automobile, truck, bus, etc.) exhaust.

A great deal of research has also been conducted on support catalysts which could effectively reduce $NO_x$ emissions from industrial, utility or vehicular sources. Out of all total $NO_x$ emissions, estimated at 20 million tons per year, combustion of fuel is by far the largest stationary and mobile source of $NO_x$. Approximately 55% of all $NO_x$ emissions originate from stationary combustion sources, 40% from mobile sources, and the rest from chemical process industries and the like. Combustion sources include boilers, internal and external combustion engines, gas turbines, incinerators, and the like. The use of gas turbine in electric utilities and in heavy-duty vehicular applications are expected to grow at phenominal rates and New Source Performance Standards (NSPS) for $NO_x$ are expected to become more stringent, particularly in view of the increasing concern over secondary particulate formation and acid rain.

B. Prior Art

Extensive research has been and is being carried out to cope with the problem of $NO_x$ and $SO_2$ emission from different sources. Few, if any, satisfactory solutions have been found dealing with $NO_x$ emissions. Conventional methods and apparatus applicable to, for example, automobile exhaust emission are either inoperable, or require major power consuming modifications.

One such approach is the experimental work reported by R. Mahhaligam et al., "Catalysts Development and Evaluation in the Control of High-Temperature $NO_x$ Emissions", *The American Institute of Chemical Engineers*, No. 211, Vol. 77, pp 9–25 (1981). The authors describe results of passing gas mixtures containing $NO_x$ through a heated support nickel and cobalt catalyst bed 10 cm long and contained inside a 2.7 cm I.D. ceramic tube.

See also S. Pancharatram, R. A. Huggins and D. M. Mason, "Catalytic Decomposition of Nitric Oxide on Zirconia by Electrolytic Removal of Oxygen", *Journal of Electrochemical Society*, 122, pp 869–875 (1975); E. F. Sverdrup, C. J. Warde and R. L. Eback, "Design of High-Temperature Solid-Electrolyte Fuel-cell Batteries for Maximum Power Output per Unit Volume", *Energy Conversion*, Vol. 13, pp 129–141 (1973); and U.S. Pat. No. 4,253,925.

U.S. Pat. No. 4,253,925, issued Mar. 3, 1981 to David M. Mason, discloses catalytic decomposition of oxygen bearing compounds such as those contained in exhaust gases from an internal combustion engine, including $NO_x$, CO and $SO_2$ by the use of a solid electrolyte comprising a stabilized oxygen-ion oxide such as scandia-stabilized zirconia. The electrolyte is in the form of a solid, non-porous thin member or film. An electric field is applied across the thickness dimension by use of electrodes at opposite faces thereof. A direct current (DC) voltage source is connected to the electrodes for generation of a unidirectional electric field through the electrolyte. A very large current-limiting resistor in series with the DC voltage source is employed to limit the current drain from the source during operation.

Mason and other prior art disclosures are restricted to the use of solid non-porous stabilized oxygen-ion electrolytes. The present invention employs a highly porous, high surface area, flow-through "solid" electrolyte, preferably a stabilized oxygen-ion electrolyte. The use by the prior art of intrinsically low surface area, solid, non-porous electrolytes results in a large, heavy and intrinsically ineffective device, whereas the present invention provides a viable device of compact and practical size and weight.

In addition, the Mason technology is restricted to operating temperatures of between 400° to 1000° C. The present invention provides a significant advance in the art as devices of the present invention are operable at temperatures of from 100° C. to 2500° C. This greatly expanded temperature range allows for useful functioning in environments or applications which would not be operable using the prior art systems. For example, the combustion chamber of a gas turbine operates at about 2000° C., well above the upper temperature limits of Mason. Further, at "idle", the manifold of the gas exhaust of automobiles only reaches a temperature of about 300° C., well below the lower limits of the Mason operating range.

Mason requires the anodic face of the electrolyte to be exposed to air. In the practice of the present invention, the anodic face may be exposed to air or to any environment including the exhaust stream itself. Thus, for example, the hot-probe of the present invention may be totally encased within the exhaust stream piping with no requirement for the electrolyte to be exposed to the air. This not only greatly simplifies the design of the device, but in particular, it lessens the ceramic sealing difficulties as well as the likelihood of a temperature gradient between the air and exhaust streams resulting in a cracking of the ceramic electrolyte.

Additionally, by requiring the anodic face of the electrolyte to be exposed to air, Mason precludes the utilization of the device to oxidize some components in the exhaust stream, i.e. the removal of insufficiently oxidized species such as partially burned hydrocarbons. The technology embodied in the present invention is not subject to that restriction and may be utilized to remove both reducible gases such as NO, $NO_2$, $N_2O_4$ and $SO_2$ as well as oxidizable gases such as partially combusted fuels.

Another significant drawback of the Mason technology is the requirement of direct current. The present invention is not so restricted, and can employ an alternating current (AC) field as well as direct current.

Thus, the present invention may be employed to eliminate toxic effluent by the techniques of oxidation (adding oxygen atoms) and/or reducing (removing oxygen atoms), and, in one preferred embodiment, requires an AC field. In this novel arrangement, the anode and cathode faces of the electrolyte are continuously reversing at an appropriate frequency (reversal rate) and with an optimal overall waveform. This design allows for both the oxidation (i.e. the conversion of CO, $CH_4$ to $CO_2$, $H_2O$) and reduction (i.e. the conversion of $NO_x$, $SO_2$ to $N_2$, $O_2$, S) of toxic and otherwise unwanted components in the gas stream.

Further, Mason utilizes an electric field to provide voltage-induced F-centers at the cathodic face for enhanced catalytic action. F-centers so provided for are the first stages of the electrolytic decomposition (electrolysis) of the ceramic electrolyte. This necessarily involves at least slight decomposition of the ceramic body, and a consequential strain within the ceramic, resulting in a greatly enhanced probability of cracking the ceramic body. Additionally, F-centers so provided for result in a lowering in the transference number of the electrolyte. This results in a greatly increased inefficient electronic, as opposed to useful ionic, conductivity of the electrolyte. Thus, the prior art arrangement greatly increases the input power requirements necessary to gain a useful gas removal efficiency.

Finally, the high voltages required to obtain activity (i.e. the generation of F-centers) in the prior art technology are generally above the thermodynamic reduction potentials of the non-toxic exhaust gases such as water and carbon dioxide. At the voltages required to operate the Pancharatram et al. prior art device to gain NO removal, the device would require more power than the motor or turbine would actually generate, i.e. the parasitic power consumption of the prior art will tend to exceed 100% of the power produced by the engine, motor or turbine.

The two above-cited Pancharatram et al. and Sverdrup et al. references essentially disclose the device of Mason without the megaohm sized current limiting resistor employed by Mason in the external electrical circuit as an improvement over the prior art.

Thus, Mason does not provide an electrochemical process, but rather discloses a catalytic process wherein the intrinsic catalytic properties of the materials are increased by the application of an electric field. This alteration from an electrochemical process to a catalytic process limits the device to the removal of gases which would otherwise be spontaneously removed from the gas stream, i.e. that have positive Gibb's energies. On a practical basis, the Mason technology would be restricted to the elimination of compounds which have positive, intrinsically unstable Gibb's energies and would preclude utility against such materials as $SO_2$ which has a negative, intrinsically stable Gibb energy.

All-in-all, a "Mason-type" non-porous electrolyte based device is impractical and inferior to the advance in the art provided by the present invention.

See also U.S. Pat. Nos. 3,755,120; 3,180,083; 2,998,308; 2,938,593; and 2,928,593; and the additional prior art made of record in the accompanying prior art statement which further show the state of the art.

In all, the literature reports that more than 600 $NO_x$ catalysts on various supports have been developed and evaluated on automotive exhaust systems. Compounds of 36 individual metals or combinations of have been used to make catalysts on about 20 different supports. Nevertheless there continues to be a substantial need for improved, reliable, efficient, more effective, economical devices which can operate over a wide range of temperatures and reliably remove $SO_2$, $NO_x$, and the like from exhaust, regardless of the source thereof.

While advances in the field have been achieved, there exists a need for the efficient treatment of exhaust gases, in particular to control both $SO_2$ and $NO_x$ emissions reliably, efficiently and in a cost effective manner over a wide variety of operating systems. The present invention meets that need.

For example, the set up costs for a 500 megawatt boiler using the technology of the present invention is approximately 90% less that than of the leading competitive technology for flue gas treatment, the Gleason et al electron beam technology. Over a twenty five year period, there is an estimated savings of approximately one billion dollars over electron flue gas treatment technology for a single power plant.

SUMMARY

The present invention provides an electrochemical fluid composition control device or scrubber for the alteration or removal of gaseous or condensed phase components of fluid streams, said device comprising a porous, high surface area, ceramic cell having a low or high surface area exterior surface, a high surface area, porous interior to permit passage of a fluid stream therethrough, and further having opposing end portions defining the ends of the pathway. A minimum of two electrically conductive regions are disposed on electronically opposing segments of the cell. A first electrode connection is provided on the cell electronically insulated from an electrically opposing segment and a first opposing electrode connection is provided on said electrically opposing segment of the cell, contacting an electronically conductive region of the cell. A seal member may be positioned at each end of the cell in fluid-tight communication therewith to form a continuous fluid pathway into and out of the cell and/or between multiple or segmented cells. Each seal member has an end portion adapted to mate with an end portion of the cell to thereby form a continuous, fluid-tight pathway through the apparatus such as an vehicle exhaust pipe, a flue, or the like.

BRIEF DESCRIPTION OF THE DRAWINGS

The present invention will be more fully understood in view of the following description, taken in conjunction with the drawings in which:

FIG. 8 is an exploded perspective view of an in-line open pore, high surface area sintered core ceramic cell;

FIG. 9 is a cross-sectional view taken along lines 9—9 of FIG. 8;

FIG. 10 is partially cut-a-way elevational view of an alternate embodiment of a high surface area, open pore solid core cell of the present invention;

FIG. 11 is a cross-sectional view taken along lines 11—11 of FIG. 10;

FIG. 12 is an end view of a radial embodiment of the present invention;

FIG. 13 is a molecular scale of a three-phase format of the present invention;

FIG. 14 is a molecular scale of a mixed conductor format of the present invention;

FIG. 22 is an infrared spectrum of an argon stream containing $N_2O_4$ before passage through a cell of this invention;

FIG. 23 is the infrared spectrum of an argon stream containing $N_2O_4$ referred to in FIG. 2 after passage through a cell of this invention.

DETAILED DESCRIPTION OF PREFERRED EMBODIMENTS

Figure 1:
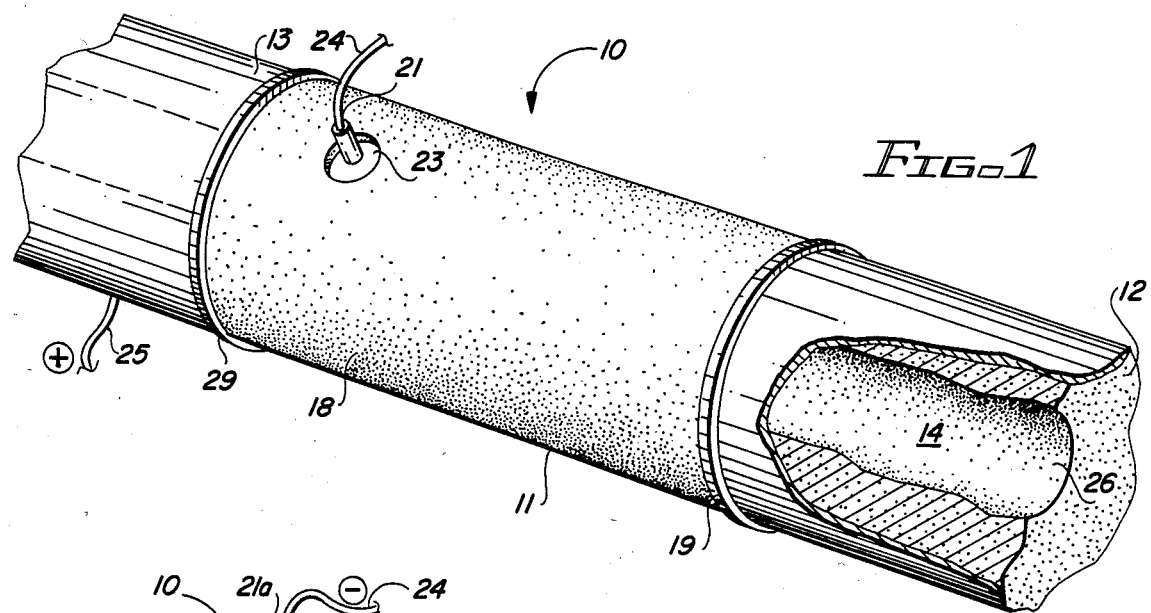
FIG. 1 is a perspective view of an assembled partial section of one embodiment of the scrubber of this invention.

Referring to FIG. 1, overall pollution control device or scrubber assembly 10 comprises electrochemical scrubber cell 11 placed in fluid tight engagement with upstream sealing member 12 at one end and downstream sealing member 13 at the other end which together form overall fluid feed pathway 14 which starts as seal feed 26.

Figure 2:
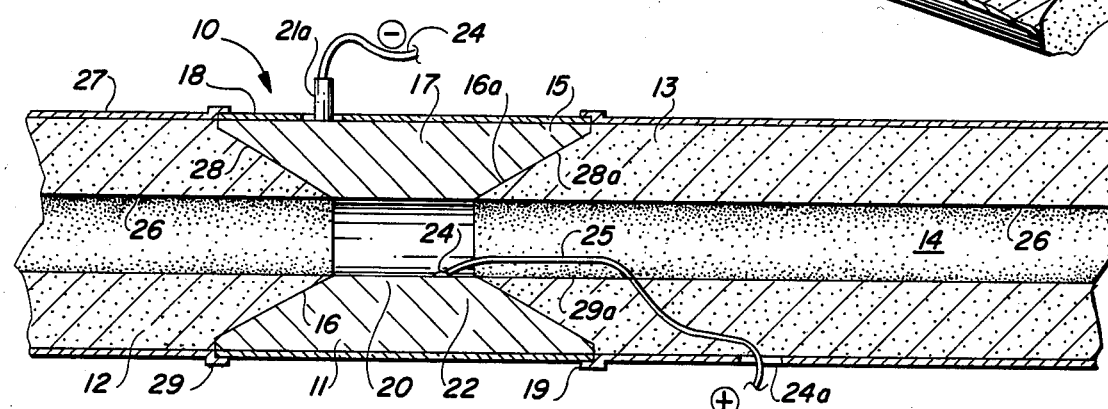
FIG. 2 is an axial cross-section elevational view of one embodiment of the scrubber, illustrating one embodiment of the centered electrochemical cell fixed between seal sections.

Sealing between these primary components is critical in many applications and is assisted by compression engagement between annular collars 29 and opposing annular shoulders 19 better shown in FIG. 2. Cell 10 is adapted to direct, alternating, or other waveform current energization by attachments to a current source via electrode connector 21 and opposing electrode connector or attachment as later shown, terminating in electrode lead 25. Cell 11 outer surface is covered with a thin porous layer of conductive material 18 which is interrupted by the absence of conductor to form nonelectronically conductive area 23. Positioned within this area is electrode connector 21 which is electrically connected to electrode lead 24.

FIG. 2 depicts one embodiment of the mating portions which form the basic seal between seal sections 12 and 13 confining the electrochemical cell between them. Cell 11 interior is composed of ceramic body 15. The surfaces of the cell are covered with conductive material coat 18 and electronically conductive material inner coating 20.

In this embodiment, the cell is configured with female conical seal-mating receiving hubs 16 and 16a on its opposing ends. Located within and penetrating the conductive coating 18 is an alternative embodiment of the connector 21 shown in FIG. 1 incorporating insulating electrode connector 21a in place of the conductive face area 23 of FIG. 1 which accommodates connector 21 within it. The cell interior which defines the fluid pathway section 17 of total pathway 14 is covered with conductive inner coating 20. Separated from the outer metal coat 20 is electrode connector 22 which is electrically connected to electrode lead 25. Electrode lead 25 is depicted as passing out of the fluid pathway 14 by exit through electrode port 24a to the exterior of the system. The electrode lead may pass through the entire fluid pathway and exit at the outer end of the apparatus if the cell is adjacent thereto.

Fluid-tight engagement is achieved by first configuring the cell into a mating relationship with the surrounding seal portions 12 and 13, shown in conical form in FIG. 2, and then providing shoulder portions 19 on each end of the cell that are adapted to abut opposing collar rings 29 at the outer periphery of each end seal. Interior fit of the mating hub portions 16 and 16a of the cell with male conical ends 28 and 28a of the sealing members is not critical as some play or non-axial movement is of no consequence. Fluid escape by lack of fluid-tight mating is compensated for by the exterior annular hubs and shoulders 29 and 19.

Figure 3:
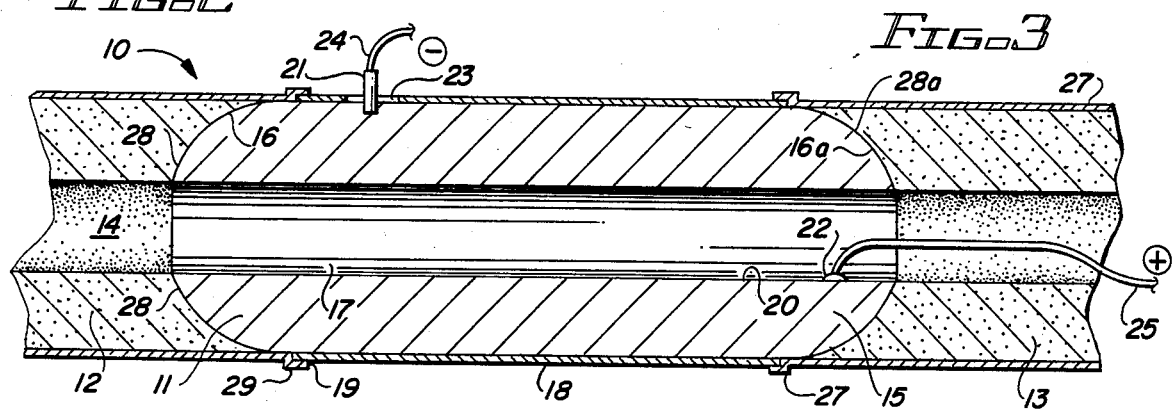
FIG. 3 is an axial cross-sectional view of the assembly showing another embodiment of the energizable cell.
Figure 4:
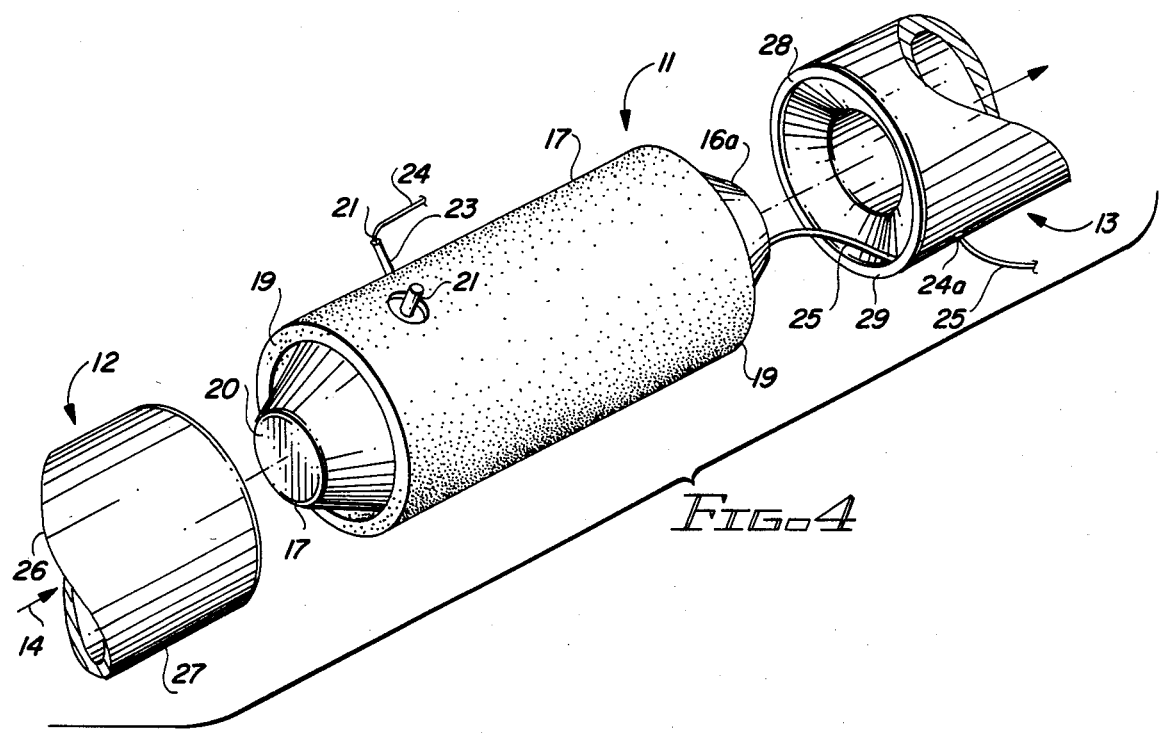
FIG. 4 is an exploded perspective view of the assembly illustrating a further alternative embodiment of the center electrochemical cell of the assembly.

In FIG. 3, an ovoid ball-and-socket embodiment of cell hubs 13 and 16a which mate with socket seal ends 20 and 28a facilitate ease of assembly and provide substantially gas-tight engagement. The electrode connector 21 is shown insulated from the conductive coating 18 of the cell by placement within a portion that is coating-free FIG. 4 is an exploded view which best illustrates a preferred conical end embodiment of the cell. During assembly, end hubs are pushed into position with opposing members of the end units 12 and 13. Compression of low to moderate levels should be used between shoulder rings 19 and seal collar 29 which may simply contact seal end surface 27a crowned with annular collar 29. Restricted seal feed path tube 26 is depicted by this view, but a restricted pathway is not necessary. Ends 12 and 13 may consist of a mating insert that opposingly matches the configuration of cell hubs 16 and 16a further provided with a peripheral collar 29. The fluid pathway through the sealing members 12 and 13 is thus defined by the smaller interior of the tube surface 27 and the interior tube is thus eliminated. During assembly of the cell, end hubs 28 are seated in locking friction engagement into the distal portions of end units 12 and 13 (the hub is not shown in unit 12).

As can be seen from the drawing, a low to moderate compression force should be present between shoulder rings 19 of cell 11 and annular seal collar 29. Restricted feed path tube 26 within the end units 12 and 13 is depicted but such a restricted tube pathway is not necessary. Ends 12 and 13 may simply comprise fluid tight open structures having the mating hub inserts 28 that opposingly match the configuration of cell hubs 16 and 16a. The fluid pathway through sealing members 12 and 13 is therefore defined by the interior of the tube surfaces 27 of the sealing members when the restricted tube surfaces 27 of the sealing members when the restricted tube 26 is eliminated.

Figure 5:
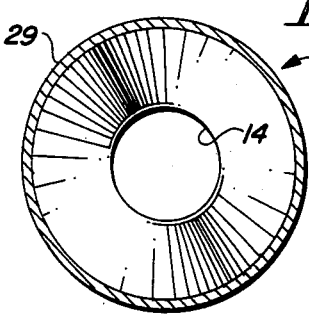
FIG. 5 is an end view of the sealing member distally located in the assembled apparatus.
Figure 6:
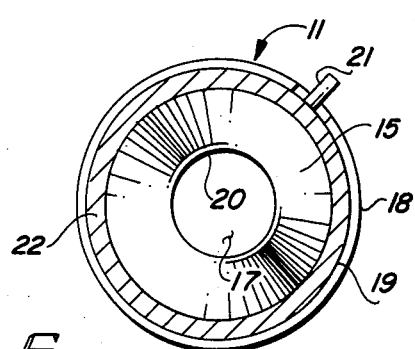
FIG. 6 is an end view of the energizable cell which is located between the distal sealing members in the scrubber assembly.

FIG. 5 shows an end view of upstream end seal 12 with optional collar 29 at its periphery adapted to contact shoulder 19 of FIG. 6. FIG. 6 is an end view of cell 11. Shoulder 19 abuts collar 29 of seal unit 12 while fluid pathway 17 communicates with fluid pathway 14 of end seals when assembled. Electrode connector 22 is located on interior conductive surface 20 while opposing electrode connector 21 (not shown in FIG. 6) is connected to the exterior conductive surface 18.

Figure 7:
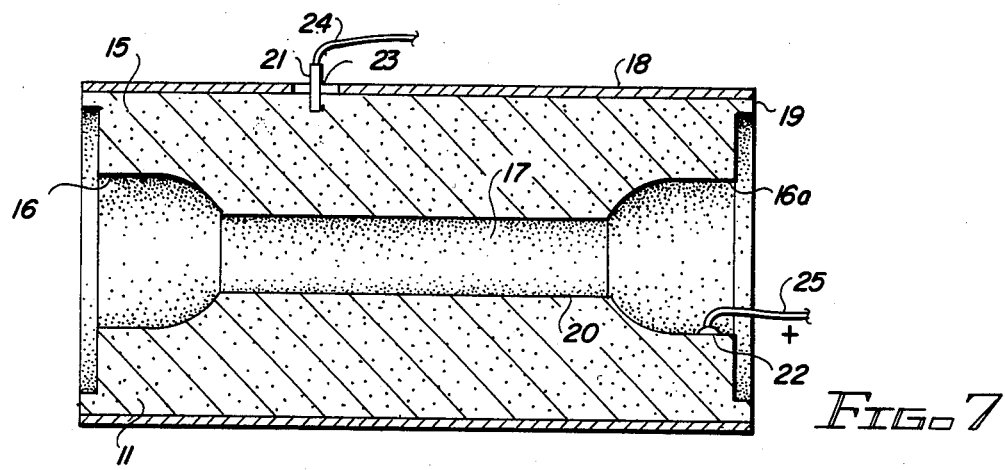
FIG. 7 is an elevational cross-section of a further alternative embodiment of the energizable scrubber cell of this invention.

FIG. 7 is a further alternative mating configuration which employs graduated ovoid rather than socket indents as FIG. 3 illustrates or conical as shown in FIGS. 2 and 4. Further, shoulder 19 is shown in the male alternative, although this is a matter of expediency, and the elements can be reversed.

FIG. 8 depicts cell 111 in the form of a high surface area, porous, solid sintered core. Cell 111 consists of porous core 40 which forms a high surface area flow through electrolyte. The interior of core 40 is homogeneous and exterior wall 41 is non-porous or glazed to render the cell peripherally fluid tight and to restrict fluid flow through passageway 14 to cell porous end hubs 42 and 42a. Electronically conductive zones 43 and 44 provided via discrete plating of a conductive metal such as silver on the outer surface of the cell and are connected by electrical leads 44 to a voltage source. The flow through electrolyte core 40 is also equipped with opposing electrical lead 45 connected to voltage source 46.

FIG. 9 is a cross-sectional view of cell 11 taken along lines 9—9 of FIG. 8. Porous sintered core 40 is covered by fluid-tight, electrolytically conductive layer 41. Within the electronically conductive core, electrical connector 44 is connected to a voltage source 46.

FIG. 10 depicts an alternate embodiment of the sintered solid core cell 211 in which high surface area core 140 is encased in exhaust stream piping 50. Core 140 is positioned within piping 50 by spacer struts 51 which allow entering gas stream 14 to pass into the core and exit as exhaust gas 14a along the axial porous surface 52 of the core and into the exhaust stream piping or flue channel 56 as well as to travel through an exit at the discharge end 53 of the core. The ceramic structure as a whole is ionically conductive. Electronically conductive band 43 has opposing lead 46 electrically fastened to it which is connected to a voltage source.

FIG. 11 is a cross-sectional view of cell 111 taken along lines 11—11 of FIG. 10 which best illustrate porous core 40 positioned within exhaust pipe 50 by spacer struts 51 to form fluid channel 56 between the core surface and exhaust stream piping 50. Electrical connector 45 is attached to the electronically conductive core and to a voltage source to create an ionically conductive cell during operation.

While the above drawings are directly applicable to the exhaust system of a vehicular or internal combustion engine, for example, larger scale industrial and flue gas treatment systems in the form of smoke stacks and the like are equally applicable. During conversion of gases, such as flue or exhaust gas oxides, to less or non-toxic corresponding elemental gases, oxyhydrides, oxides or hydrides, trapping or collection of end products is sometimes desirable. In the case of, for example, reduction of sulfur dioxide to elemental sulfur, the end product, upon cooling through or past the downstream seal end member becomes liquid and then solid and can safely be expelled without collection, or alternatively may be captured and therefore not released to the environment. Nitrogen oxides may be reduced to nitrogen gas by this invention which is innocuous and may be freely introduced into the atmosphere. However, in the treatment of large quantities of flue gases, it may be desirable to provide collection means, for example, by vertical cooling of the scrubbed flue gas and collection via bags or precipitators. Alternatively, elemental sulfur produced by this invention may be trapped as the liquid and allowed to cool to the solid form as, for example, ingots.

If desired, rather than altering fluid stream components such as the nitrogen oxides to nitrogen gas, alteration may be carred out to add hydrogen, thus producing hydrides or oxyhydrides such as ammonia, and the compound so produced collected by processors known in the art. Alternatively, the reduced species such as ammonia so generated may be allowed to catalytically, or non-catalytically, react with materials such as $NO_x$ or $SO_x$ to further remove toxic or unwanted species from the gas stream.

The electrochemical cell of the present invention comprises a porous, high surface area, solid electrolyte, preferably a porous, high surface area solid metal oxide electrolyte such as yttria stabilized zirconia. Numerous solid metal oxides may be employed as the electrolyte in the practice of this invention. Suitable oxides include, but are not limited to zirconia ($ZrO_2$), hafnia (HfO), titania ($TiO_2$), lanthanides such as ceria ($CeO_2$), samaria ($Sm_2O_3$), yttria ($Y_2O_3$), erbia ($Er_2O_3$), scandia ($ScO_2$), perovskites, pyrochlores, calcia($CaO_2$), magnesia (MgO), gadolinia ($Gd_2O_3$), bismuth oxide ($Bi_2O_3$) and the like, or a combination of one or more of the above oxides. Preferably one or more metal salts may be included in the electolyte. Especially preferred metal salts are the oxides, silicates, fluorides, carbides, borides or nitrides of metals wherein the oxidation state of the metal is one or greater but not greater than seven. Illustrative salts include, but are not limited to titanium diboride ($TiB_2$), molybdenum disilicide ($MoSi_2$), chromium carbide (CrC), zirconium carbide (ZrC), silicon carbide (SiC), magnesia (MgO), lanthium oxide ($LnO_x$), and yttria ($Y_2O_3$).

The preferred electrolytes are stabilized solid oxides. The preferred stabilized solid oxides are yttria stablilized zirconia (YSZ), gadolinia stablized ceria and erbia stabilized bismuth oxide. Especially preferred electrolytes are yttria stabilized zirconia comprising 10 weight percent yttria. Additional preferred stabilized electrolytes include erbia stabilized bismuth oxide, calcia stabilized zirconia comprising 8-12 weight percent calcia and ceria stabilized with gadolinia and other lanthanides such as praseodymia and samaria.

The high surface area, porous, solid oxide electrolyte of the present invention may be fabricated as an open cell foam, a sintered packed bed, a honeycomb with a repeating polygon form, wherein said polygon has 3 or more sides or a series of generally planar surfaces, or an open cell tube or shell. The oxide as a powder having a diameter of from 0.001 to 10,000, preferably 1.0 to 1,000, microns in diameter, may be packed under pressure in a housing and sintered.

In one embodiment, a sintered, packed bed cell may be prepared by packing a mixture of yttria-stabilized zirconia powder blended with a hydrogen bonding, solid, combustible organic binder and packed in an isostatic press at room temperature and 50,000 psi. The use of isostatic pressure avoids cracking or otherwise damaging the ceramic. The cell is then fired in air for three hours at 1400° C. after a gradual increase in temperature. It is preferred to increase the temperature from room temperature to 600° C. over a period of approximately 18 hours and thereafter to increase the temperature to to 1400° C.–1500° C. over a three to four hour period, and thereafter maintain the temperature at 1400°–1500° C. for from 1 to 4 hours during which period virtually all of the sintering occurs. When an organic binder is employed, it is very important to raise the temperature slowly over a period of time to allow for a gentle and orderly removal of moisture and volatiles, the melting of the binder and the oxidative removal of the binder without disturbing the packed powder.

Generally speaking, the coarse oxide powder is admixed with from 0.01 to 75 weight percent of an organic binder having a low metal content. Suitable organic binders include, but are not limited to, alcohols, carboxylic acids, preferably materials which are solid at room temperature such as the higher alkyl (fatty) alcohols, ethers and carboxylic acids such as, for example, polyacrylic acid, polyvinyl alcohol, stearic acid, nonadecanol, polyethylene oxide and the like.

In addition to the coarse oxide powder and organic binder, the solid oxide electrolyte may also comprise up to 50 weight percent of fine oxide powder (bimodal) and preferably may additionally include up to 5 weight percent of ceramic fines as sintering aids.

It is especially preferred to include a porosity filler such as polymer beads or reducible, meltable, non-reactive metal beads such as zinc, iron, nickel, copper, or silver beads, to obtain the desired pore sizes and distribution in the sintered cell. The metal beads have the advantage of maintaining structural support until the sintering stage, during which they are removed by melting, which is very important. Alternatively, the powder may be plated prior to sintering with, for example, nickel or zinc, which can subsequently be removed in an chemical bath, such as dilute hydrochloric acid or fired under an argon or hydrogen atmosphere and allowed to sublimate or melt. Additionally, the cell may be etched in, for example, hydrofluoric or sulfuric acid to remove the unwanted materials such as silica and silicates or to improve the pore structure.

To avoid cracking due to thermal maldistribution stress, it is preferred that the cell, when hot, be placed within a thermal homogenizer. Such a device has a much higher thermal conductivity than the cell, and will therefore tend to lessen temperature variations across the cell. A section of stainless steel or Inconel nickel/chromium/iron alloy pipe has been found to work well. Alternatively, the cell may be wrapped in a metal mesh "fabric". Additionally, to lessen radial heat transfer from the cell it may be wrapped in an insulating ceramic, paper, or textile such as commercially available alumina ($Al_2O_3$) or zirconia ($ZrO_2$) textiles. An especially preferred embodiment is to wrap the cell in one or more layers of metal mesh, that body being subsequently wrapped in one or more layers of ceramic textile. Where appropriate, that "twice layered" body may be snugly fitted within a room temperature or heated section of gas pipe. This unit is then installable as a pipe section in an emission control assembly. To avoid cracking of the cell due to sudden compression when a compression seal is used, a shock absorber such as a rubber pad should be placed in the line of force of the compression mechanism.

The cells of the present invention may be machined by mounting the cell in the rotating chuck of a machine lathe and employing a stationary tool. The "ball" seals depicted in the drawings may conveniently be formed by mounting a ball mill on the stationary chuck and using an oil based silicon carbide (SiC) grit to aid the machine process. Care must be taken to avoid undue heating and cracking. Using this technique, it is possible to routinely produce mirror surface, vacuum tight ceramic pieces.

Cells without walls may be prepared by packing the powder mixture into a tube of the appropriate dimension. The powder/binder/porosity filler may then be pressed in a standard press or an isostatic press. The preferred tube materials are zirconium, graphite, and low metals content plastics.

Portions of the cell may be rendered electrically conductive by electrolytic or electroless coating or plating with a conductive material which is stable at operating temperatures. Silver, cobalt, nickel, copper, iron and platinum are the preferred plating materials. A shoulder or ring at each end of the cell may be abraded so that there is no direct electrical contact between the electronically conductive material on the inside and outside of the cell. Alternatively, the end rings may be masked prior to the plating step.

The plating is generally carried out by methods well know in the art to form at least two discrete electrodes on the cell.

Generally speaking, the preferred silver plating solution is prepared in a multistep process as follows. Solution A, which comprises 64% by volume of the final plating solution is prepared by dissolving 50 grams of silver nitrate per 2 liters of distilled, deionized water. Solution B, which comprises 32% by volume of the final solution is prepared by dissolving 90 grams of potassium hydroxide per 2 liters of distilled, deionized water. Solution C, which comprises 2% by volume of the final solution is prepared by adding 80 grams of cane sugar per 800 ml of deionized water, adding 100 ml of 95% ethanol and 3.5 ml of concentrated nitric acid, and either boiling the solution for 30 minutes or alternatively aging the solution for 30 days. Solution D which also comprises approximately 2% by volume of the final solution is distilled or deionized water which serves as a diluent.

Concentrated aqueous ammonium hydroxide is added dropwise to solution A until a dark precipitate forms. Approximately half of solution B is then added. Thereafter, concentrated ammonium hydroxide is added dropwise until only a small amount of precipitate remains. The remaining portion of solution B is then added slowly dropwise, with stirring and with the simultaneous dropwise addition of ammonium hydroxide. At this point, all of the precipitate should be barely dissolved. This solution should be cooled to a slush at 0° C. and used within one hour. Solution D is then cooled to a slush at approximately 0° C. and added to solution A slowly with stirring. Solution C, also cooled to a slush at 0° C. is then added to the mixture with stirring.

A room temperature cell is placed in a chilled (0° C.) plating vessel and the plating solution is poured over the ceramic cell in the vessel and allowed to warm to room temperature. The solution is then heated to a slow simmer. It is preferable to provide a slight vibration or stirring action during plating.

It will be apparent to one skilled in the art that the proportions of solutions D and C may be varied to achieve the desired result, and that the cell may be masked prior to plating to control the location of the deposition of metal on the ceramic cell. It will also be apparent to one skilled in the art that it may be desirable to plate multiple layers for improved cell performance.

It is generally desirable to clean and harden the coating between multiple layers. Annealing is preferably conducted at a temperature of from 100° C. to 500° C. for from 5 to 60 minutes between the deposition of one or more layers.

Similarly, a nickel plating solution suitable for use in the present invention may be prepared as follows. Solution A is prepared by dissolving 10 grams per liter of $SnCl_2$ and 10 ml/liter of concentrated hydrochloric acid in distilled, deionized water. Solution B is prepared from 0.5 grams per liter of $PdCl_2$ and 10 ml/liter of concentrated hydrochloric acid in deionized water. Solution C comprises solution $C_1$ prepared from 45 grams per liter of $NiCl_2.6H_2O$, 50 grams per liter of ammonium chloride, 100 grams per liter of sodium citrate and 0.5 grams/liter of ammonium hydroxide. Solution $C_2$ comprises 450 grams per liter of sodium hypophosphite.

To plate electrode regions on a cell, the cell, appropriately masked, is immersed in solution A for 5 minutes, rinsed with distilled water and immersed in solution B for 5 minutes. Solutions A and B are sensitizing baths. Thereafter, approximately 200-300 cc of solution $C_2$ is added to each liter of solution $C_1$ with stirring and the cell is immersed therein. Preferably, Solution C is chilled to a slush, the room temperature cell immersed therein and the plating solution allowed to warm to room temperature, whereupon plating is carried out as described above.

Additional metals or combination of metals suitable for use in the present invention include, but are not limited to, platinum, rhodium, palladium, copper, iron, rhuthenium, iridium, nickel/zinc, silver/platinum, nickel/zinc/cobalt, copper/zinc, copper/nickel/zinc, nickel/palladium, nickel/rhuthenium, nickel/platinum, copper/iron, and the like, For example, if platinum is employed as the plating metal, the following procedure may be employed. To distilled water (0.5 ml) are added aqueous methylamine (10 ml of 40%) and ammonium hexachloroplatinate (0.5 gram) with stirring. Hydrazine hydrate (2.5 cc) is added with stirring, and the liquid is slowly pumped over and through the cell, maintaining the liquid at approximately room temperature, with a heat lamp placed over and focused on the cell. The relative warmth of the cell causes the platinum to plate on the ceramic rather than the colder vessel walls. This is economically important when working with expensive materials such as platinum, rhuthenium, rhodium and palladium.

After a black/grey film has been deposited, the apparatus may be heated to a temperature of from 70° C.-100° C. to plate the balance of the platinum. The cell is then rinsed with distilled water and fired to a temperature of approximately 250° C. for approximately 5 to 60 minutes between layers.

A platinum/rhodium bath may be prepared following the above procedure for a platinum bath by replacing up to 90% of the ammonium hexachloroplatinate with the appropriate concentration of rhodium trichloride.3-$H_2O$.

A rhuthenium plating bath may be prepared by adding rhuthenium chloride (0.2 gram) to 0.07 g of hydrochloric acid and 10 ml of distilled water. Methylamine (5 ml of 40%) is added thereto and the solution allowed to stand for approximately 1 hour. To a stirring solution is then added hydrazine hydrate (0.5 cc) and the cell immersed therein for plating. During plating, the solution may be heated to a temperature of between 70° to 100° C.

The porous sintered cell provides a high surface area reactor. The desired surface area may also be achieved by extrusion of a shape such as a honeycomb or a foam, preferably of an open cell type.

Thus, the desired surface area may be obtained via a sintered packed bed, a honeycomb (preferably extruded), or an open cell ceramic foam, having a pore size between 0.1 to 1000, preferably 10 to 100 pores per inch.

One of the difficulties in providing a solid electrolyte scrubber or pollution control device is in providing a seal which will withstand the operating conditions without losing integrity. Thus, depending on the application, the seal assembly may be a critical part of this invention.

It is critical that the seal allow motion of the cell for thermal effects, vibration, shock and other operating conditions which could otherwise lead to failure. The present invention provides for such movement by a "ball and socket" arrangement between the seal element and the cell. As shown in the drawings, the cell ends may be conical, spherical or tapered, graduating between conical and spherical, and are received within an appropriately configured female receptor end of the seal. The spherical embodiment is preferred. An "O"-ring arrangement may conveniently act as an interface to the sealing surfaces along a line of compression.

It is frequently convenient to use the seals as electrical connectors to the cell. It is thus useful to employ electrically conductive materials as all or part of the seal. Suitable materials include stainless steels such as Inconel alloys, ceramics such as silicon carbide, chromium carbide, or other suitable carbides, oxides, nitrides and borides, "cermets", metal/non-metal composites such as nickel/chromium/chromium carbide, clad or "faced" forms such as alumina or mullite covered with a conductive material such as silver and the like.

The preferred seal materials are Inconel 601 stainless steel wherein the machined surface is arc plasma sprayed with an electrically conductive cermet of the type employed to protect turbine blades. Also preferred is silicon carbide and non-conductive ceramics such as alumina, corderite or mullite.

The end seals may comprise a hard face with an optional thin lubricant/sealant coating of a material such as silver which will operate as a lubricant at temperatures of up to 700°-900° C., or may be a conductive ceramic such as silicon carbide or molybdenum carbide which can withstand temperatures of greater than approximately 1500° C. or an oxide such as aluminum oxide ($Al_2O_3$), zirconium oxide ($ZrO_2$), or thoria ($ThO_2$) which can serve up to temperatures of approximately 2600° C.

The relationship between the current passing through the cell of the present invention and the removal of noxious gases (i.e. NO, $SO_2$,) can be expressed as follows:

$i = i(\text{ionic}) + i(\text{electronic})$ wherein i is current in milliamps (mA). Thus, observed current is the simultaneous sums of two different currents, the ionic current, and the generally irrelevant background or electronic current. Therefore, the actual useful current is calculated by the formula:

$-i(\text{electronic}) = i(\text{ionic})$ also represented as $i - i_o$ or $mA - mA_o$.

The value of i(ionic) may be related to the efficiency of noxious gas removal according to Faraday's Law:

$i(\text{ionic}) = [F] \times [\#eq] \times [\text{moles gas removed/second}]$ wherein F is Faraday's constant (96,489±2), and #eq is the number of equivalents per mole or the number of electrons passed per molecule of gas altered. The #eq value for certain gases is as follows:

| Gas | #eq |
|---|---|
| NO | 2 |
| NO$_2$ | 4 |
| SO$_2$ | 4 |
| N$_2$O | 2 |
| O$_2$ | 4 |
| H$_2$O | 2 |

In general, this value will be 2 for each oxygen atom removed from or added to the molecule.

Since it is frequently more convenient to deal with gases in terms of liters/minute rather than moles/second, the above statement of Faraday's law may be modified in an approximate form by substituting the Ideal Gas Law for the moles/second term. The resulting equation is as follows:

$$i(\text{ionic}) = mA = \frac{(F \times P \times 1000 \times \#eq)}{(R \times T \times 60)} \times (l/\text{min})([\text{gas}])$$

wherein: mA is the current in milliamps due to the electrochemical removal of noxious gases by the cell of the invention; F is Faraday Constant, P is the pressure of the gas stream in atmospheres as it enters the cell; 1000 is the factor employed when dealing with milliamps; R is the Universal Gas Constant with a value of 0.082; #eq has the meaning defined above; T is the temperature of the gas in degrees Kelvin before it enters the cell, 60 is the seconds to minutes conversion factor; 1/min (liters/minute) is the total flow rate of the gas stream as it enters the cell; and [gas] (gas concentration) is the mole fraction or equivalently, the volume fraction, of noxious gas in the total gas stream.

The cell reactions are represented by the following formulae in which g stands for gas, e is electron, SZ is stabilized zirconia, and N, S, and O are nitrogen, sulfur and oxygen, respectively.

At the cell cathode, the reactions are represented by the formulae:

$4e^- + SO_2(g) = S(g) + 2O^{2-}$ $4e^- + 2NO(g) = N_2(g) + 2O^{2-}$

At the cell anode, the reaction is represented by the formula:

$2O^{2-} = O_2(g) + 4e^-$

The overall cell reactions are represented by the formulae:

$SO_2(g) = S(g) + O_2(g)$ or $2NO(g) = N_2(g) + O_2(g)$

In the case, for example, of stabilized zirconia as the electrolyte and silver as the electrode, the cell reactions are represented by the formulae:

$SO_2(g,Ag); S(g,Ag)/O^{2-}(SZ)/O_2(g,Ag)$ $NO(g,Ag); N_2(g,Ag)/O^{2-}(/SZ)/O_2(g,Ag)$

The present invention will be better understood in light of the following examples.

In the examples, the pressure is one atmosphere unless otherwise specified. Measurements were taken using a Digital multimeter. The voltage source in all cases was a Hewlett Packard DC power supply. Infrared spectra of the gas stream were measured with a Fourier transform I.R.. Cyclic volameter measurements were taken with a Pine Instruments potentiostat.

EXAMPLE 1

A yttria-stabilized zirconia tube having a length of 2½ inch, an outer diameter of ¾ inch and an inner diameter of ⅝ inch (Zircoa, Solon, Ohio) was packed with a mixture of 47 g of yttria stabilized zirconia powder (500–800 microns) and 3 g of CH$_3$C(C$_6$H$_5$)$_2$OH in an isostatic press at 50,000 lb/in$^2$. The packed cell was fired in air for 3 hours at 1400° C. after slowly raising the temperature to 1400° C. using the temperature/time profile set forth in Table I wherein R.T. stands for room temperature.

TABLE I

| Temperature | Time (hours) |
|---|---|
| R.T. to 60° C. | 0.5 |
| 60° C. to 600° C. | 18.0 |
| 600° C. to 1400° C. | 3.5 |
| 1400° C. | 3.0 |
| 1400° C. to R.T. | 7.0 |

The slow climb to 600° C. is very important as it allows for a gentle and orderly removal of moisture and volatiles, the melting of the binder, and the oxidative removal of the binder without disturbing the packed yttria-stabilized zirconia powder.

EXAMPLE 2

The cell of Example 1 was silver-plated by the following procedure. A four part plating solution was prepared as follows. Solution A, which comprises 64% by volume of the final plating solution was prepared by dissolving 50 grams of silver nitrate per 2 liters of distilled, deionized water. Solution B, which comprises 32% by volume of the final solution was prepared by dissolving 90 grams of potassium hydroxide per 2 liters of distilled, deionized water. Solution C, which comprises 2% by volume of the final solution was prepared by adding 80 grams of cane sugar per 800 ml of distilled, deionized water, adding 100 ml of 95% ethanol and 3.5 ml of concentrated nitric acid, and boiling the solution for 30 minutes. Solution D which also comprises approximately 2% by volume of the final solution is distilled, deionized water which serves as a diluent.

Concentrated aqueous ammonium hydroxide was added dropwise to solution A until a dark precipitate formed. Approximately half of solution B was then added. Thereafter, concentrated ammonium hydroxide was added dropwise until only a small amount of precipitate remained. The remaining portion of solution B was then added slowly dropwise, with stirring and with the simultaneous dropwise addition of ammonium hydroxide. The resulting solution was cooled to a slush at 0° C. Solution D was then cooled to a slush at approximately 0° C. and added to solution A slowly with stirring. Solution C, also cooled to a slush at 0° C. was then added to the mixture with stirring.

A room temperature cell, prepared by the method of Example 1, and appropriately masked, was placed in a chilled (0° C.) plating vessel equipped with a Masterflex parastolic pump and vertical tygon tubing having a diameter of ¼" throughout the system with the exception of the very top where ½" tygon tubing is employed so that air bubbles exit out the top. The cell was sealed in place using a pneumatic ram. The plating solution was fed into the plating vessel via a 1 liter separatory funnel and circulated around the cell and allowed to warm to room temperature. The solution was then heated to a slow simmer and allowed to circulate for 1 hour. The solution was then drained from the plating vessel, the cell washed with distilled, deionized water and the coating annealed in a split top furnace at 200° C. for 72 hours. The efficiency of the cell in removing nitrogen oxide (NO) from a gas stream containing 175 ppm NO was calculated to be 99%.

EXAMPLE 3

A nitrogen oxide (NO) stream containing 1000 ppm NO was passed through the plated cell of Example 2 at a gas flow rate of 0.58 l/m/cm$^2$, a temperature of 450° C. and a voltage of 2.00 V and the current through the cell measured with a Digital Multimeter. The results are summarized in Table II below.

TABLE

| $E-E_o$ | $i-i_e$ (mA) | Efficiency |
|---|---|---|
| 0 | 0 | — |
| 0.281 | 0.3 | 4% |
| 0.481 | 1.0 | 13% |
| 0.682 | 2.8 | 36% |
| 0.888 | 5.2 | 68% |
| 1.082 | 7.7 | 100% |
| 1.281 | 7.1 | 92% |
| 1.481 | 7.3 | 95% |
| 1.681 | 7.1 | 92% |
| 1.881 | 7.5 | 98% |

In the above table, $E-E_o$ is the overpotential (the voltage applied above the open circuit potential, referenced to a silver/air reference electrode. The above data show the relationship between overpotential, ionic current and NO removal efficiency. Aging the cell at 500° C. for 10 days in air improves the cell efficiency.

The relationship between the overpotential and the efficiency of NO removal from a flowing gas stream at 450° C. and 1000 ppm NO is graphically depicted in FIG. 25.

EXAMPLE 4

A nitrogen oxide stream containing 100 ppm NO was passed through the cell of Example 2 at a gas flow rate of 19 l/m/cm$^2$, a temperature of 748° C. and and the applied overpotential was varied between 0 and 1 volt. The volumetric turnover rate (VTR) is in units of gram-moles of NO removed per minute per cm$^3$ of cell core and was fitted by a least square analysis to a linear function of overpotential, with the appropriate constants and $R^2$ correlation coefficients being included with the data set. The data are set forth in TABLE III.

TABLE III

| $E-E_o$ | $i-i_e$ (mA) | $n/M \times cm^3$ |
|---|---|---|
| 0 | 0 | 0 |
| 0.20 | 2.0 | $39 \times 10^{-6}$ |
| 0.39 | 3.8 | $74 \times 10^{-6}$ |
| 0.59 | 6.3 | $125 \times 10^{-6}$ |
| 0.79 | 8.3 | $163 \times 10^{-6}$ |
| 0.99 | 10.5 | $206 \times 10^{-6}$ |

$n/M \times cm^3 = 210 \times 10^{-6} \times (E-E_o) - 2.5 \times 10^{-6}$; $R^2 = 0.999$

EXAMPLE 5

Following the procedure of Example 4, with a NO content of the gas stream held constant at 175 ppm, the data set forth in TABLE IV were obtained.

TABLE IV

| $E-E_o$ | $i-i_e$ (mA) | $n/M \times cm^3$ |
|---|---|---|
| 0 | 0 | 0 |
| 0.20 | 2.2 | $41 \times 10^{-6}$ |
| 0.40 | 4.5 | $89 \times 10^{-6}$ |
| 0.60 | 8.4 | $163 \times 10^{-6}$ |
| 0.80 | 10.6 | $211 \times 10^{-6}$ |
| 1.00 | 12.2 | $238 \times 10^{-6}$ |

$n/M \times cm^3 = 253 \times 10^{-6} (E-E_o) - 3.2 \times 10^{-6}$; $R^2 = 0.993$

EXAMPLE 6

A yttria-stablized zirconia cell with silver/platinum porous electrodes was prepared following the procedures of Examples 1 and 2 and aged at 500° C. for 10 days in air. Isopotential measurements of ionic current and volumetric turnover rate were made when the NO content of the gas stream was varied between 0 and 175 ppm at three temperatures, 624° C., 706° C. and 748° C. and a gas flow rate of 19 l/m/cm$^2$. The overpotential of 1.9 V is higher than would be used in a commercial unit, where the potential electrolysis of water sets up a practical limit of approximately one volt on the applied volage. These NO concentrations are comparable to those found in certain combusiont units such as a natural gas fired boiler.

The data set forth in TABLES VA, VB and VC was fitted by a least squares procedure to a linear dependence of the VTR on the NO content of the gas. The constants as well as the correlation coefficients, $R^2$, are given for each of the three temperatures.

TABLE VA

| | 624° C. | |
|---|---|---|
| ppm NO | $i-i_e$ (mA) | $n/M \times cm^3$ |
| 0 | 0 | 0 |
| 25 | 0.7 | $14 \times 10^{-6}$ |
| 50 | 1.5 | $29 \times 10^{-6}$ |
| 75 | 2.1 | $41 \times 10^{-6}$ |
| 100 | 2.4 | $47 \times 10^{-6}$ |
| 125 | 2.7 | $53 \times 10^{-6}$ |
| 150 | 2.9 | $58 \times 10^{-6}$ |
| 175 | 3.1 | $61 \times 10^{-6}$ |

$n/M \times cm^3 = 0.348$ (ppm NO) $+ 7.4 \times 10^{-6}$; $R^2 = 0.97$

TABLE VB

| | 706° C. | |
|---|---|---|
| ppm NO | i-$i_e$ (mA) | n/M × cm$^3$ |
| 0 | 0 | 0 |
| 25 | 0.7 | 14 × 10$^{-6}$ |
| 50 | 2.8 | 54 × 10$^{-6}$ |
| 75 | 4.1 | 82 × 10$^{-6}$ |
| 100 | 5.0 | 97 × 10$^{-6}$ |
| 125 | 6.3 | 126 × 10$^{-6}$ |
| 150 | 7.6 | 152 × 10$^{-6}$ |
| 175 | 8.3 | 163 × 10$^{-6}$ | n/M × cm$^3$ = 0.98 (ppm NO) + 0.017 × 10$^{-6}$; R$^2$ = 0.994

TABLE VC

| | 748° C. | |
|---|---|---|
| ppm NO | i-$i_e$ (mA) | n/M × cm$^3$ |
| 0 | 0 | 0 |
| 25 | 2.3 | 46 × 10$^{-6}$ |
| 50 | 5.1 | 101 × 10$^{-6}$ |
| 75 | 5.7 | 114 × 10$^{-6}$ |
| 100 | 6.7 | 132 × 10$^{-6}$ |
| 125 | 7.6 | 151 × 10$^{-6}$ |
| 150 | 8.5 | 169 × 10$^{-6}$ |
| 175 | 9.0 | 177 × 10$^{-6}$ | n/M × cm$^3$ = 0.96 (ppm NO) + 27 × 10$^{-6}$; R$^2$ = 0.96

EXAMPLE 7

Using the cell of Example 2, a fluid stream containing 1000 ppm NO was passed through the cell at a flow rate of 0.58 l/m/cm$^2$ at 400° C. The observed volumetric turnover rate vs overpotential is summarized in TABLE VI below.

TABLE VI

| E-$E_o$ | i-$i_e$ (mA) | n/M × cm$^3$ |
|---|---|---|
| 0 | 0 | 0 |
| 0.298 | 0.1 | 0.3 × 10$^{-6}$ |
| 0.498 | 0.8 | 3.0 × 10$^{-6}$ |
| 0.698 | 1.8 | 7.0 × 10$^{-6}$ |
| 0.898 | 2.3 | 9.1 × 10$^{-6}$ |
| 1.098 | 3.2 | 12.7 × 10$^{-6}$ |
| 1.298 | 3.7 | 14.5 × 10$^{-6}$ | n/M × cm$^3$ = 12.5 × 10$^{-6(E-E_o)}$ − 1.9 × 10$^{-6}$; R$^2$ = 0.98

EXAMPLE 8

Using the cell of Example 2, a fluid stream containing 1000 ppm NO was passed through the cell at a flow rate of 0.58 l/m/cm$^2$ at 500° C. The observed volumetric turnover rate vs overpotential is summarized in TABLE VII below.

TABLE VII

| E-$E_o$ | i-$i_e$ (mA) | n/M × cm$^3$ |
|---|---|---|
| 0 | 0 | 0 |
| 0.274 | 0.7 | 2.7 × 10$^{-6}$ |
| 0.475 | 1.4 | 5.4 × 10$^{-6}$ |
| 0.675 | 1.9 | 7.6 × 10$^{-6}$ |
| 0.874 | 2.9 | 11.5 × 10$^{-6}$ |
| 1.074 | 4.1 | 16.0 × 10$^{-6}$ |
| 1.275 | 4.6 | 18.1 × 10$^{-6}$ |
| 1.476 | 5.3 | 20.9 × 10$^{-6}$ | n/M × cm$^3$ = 14.9 × 10$^{-6}$ (E-$E_o$) − 1.1 × 10$^{-6}$; R$^2$ = 0.994

EXAMPLES 9-15

Following the procedures of Examples 1 and 2, a number of yttria-stablized zirconia cells of the present invention were prepared under varying conditions as summarized in Table VIII below.

TABLE VIII

| Example | Wgt % Organic | Size (in.) o.d. | Sintering Temp | Sintering Time (hr) |
|---|---|---|---|---|
| 20 | 2 | 2 | 1500° C. | 2 |
| 21 | 6 | 2.5 | 1400° C. | 3 |
| 22 | 6 | 6 | 1400° C. | 1 |
| 23 | 9 | 2 | 1400° C. | 4 |
| 24 | 9 | 2 | 1400° C. | 1 |
| 25 | 12 | 2 | 1400° C. | 3 |
| 26 | 12 | 2 | 1400° C. | 3 |

EXAMPLE 16

A calcia-stabilized zirconia cell was prepared according to the method of Examples 1 and 2 from calcia stabilized zirconia powder (ZrO$_2$ 0.87M, CaO 0.13M) prepared as follows. To 349.92 ml of zirconium propoxide was added 122.5 ml of concentrated nitric acid. In a separate vessel, calcium carbonate (13 grams) was dissolved in concentrated nitric acid, and water (5 cc) added after the bubbling stopped. The zirconium propoxide and calcium carbonate solutions were combined and a clear red-brown solution obtained. The solution was added to a vigorously stirring solution of aqueous ammonia, centrifuged, and the fluid discarded. The solids were washed (2×) with 0.1M aqueous ammonia, heated at a temperature of 90° C. for 12 hours to dry and dissociate any remaining nitrates and heated to approximately 1000° C. to convert the material to the oxide phase. The calcia-stabilized zirconia powder so obtain was packed into a calcia stabilized zirconia tube (Alfa Chemical) and sintered by the process of Example 1.

EXAMPLE 17

A calcia-stabilized zirconium doped cesia cell (Zr, CeO$_2$, 0.87 Molar; CaO, 0.13 Molar) was prepared by the methods of Examples 1 and 2 from powder prepared as follows. Zirconium propoxide (31 cc) was dissolved in concentrated nitric acid (10 cc). In a separate vessel concentrated nitric acid (4 cc) was added to calcium carbonate (1.3 gram) until solution was complete and cerium chloride septahydrate (3.72 grams) added thereto. The two solutions were mixed to obtain a reddish brown solution which was added to a vigorously stirring aqueous ammonia solution and the method of Example 16 followed thereafter.

EXAMPLE 18

Calcia stabilized ceria powder (CeO$_2$, 0.85M; CaO, 0.15M) was prepared by the method of Example 16 by dissolving calcium carbonate (1.5 grams) in deionized water (70 ml) containing nitric acid (5 ml), dissolving cerium chloride septahydrate (31.62 grams) in concentrated nitric acid, and proceeding according the the process of Example 16. Following completion of the preparation of the powder, a cell was prepared following

EXAMPLE 19

Yttria stabilized zirconia powder (ZrO$_2$, 0.91M; Y$_2$O$_3$, 0.9M) was prepared by the method of Example 16 from a solution of zirconium propoxide (36.6 ml, methanol (30 ml) and concentrated nitric acid (13 ml) and a solution of yttrium nitrate sexahydrate (3.45 grams) in dionized water (70 ml) and concentrated nitric acid (5 ml). Following completion of converting the powder to the oxide phase, a cell was prepared by the methods of Examples 1 and 2.

EXAMPLE 20

A calcia stabilized zirconia doped with iron oxide cell was prepared by the methods of Examples 1 and 2 from a pale green powder produced as follows. An iron solution was prepared by dissolving ferrous chloride (2.03 grams) in a concentrated hydrobromic acid/ethylene glycol [2:3 (v/v)]. The final iron concentration was 0.0102M. A solution of zirconium propoxide (349.92 ml) in concentrated nitric acid (122.5 ml) and a solution of calcium carbonate (13 grams) in concentrated nitric acid, were combined according to the method of Example 16 and aliquots of the combined solution added to the ferrous chloride solution according to TABLE IX:

TABLE IX $[(ZrO_2)_{0.87}(CaO)_{0.13}]_{1-x}[FeO]_x$

| x | Moles of Fe | Vol. of Fe Soln (ml) |
|---|---|---|
| 0.0025 | $2.4 \times 10^{-5}$ | 0.2353 |
| 0.0050 | $4.8 \times 10^{-5}$ | 0.4706 |
| 0.0100 | $9.7 \times 10^{-5}$ | 0.9461 |
| 0.0200 | $1.93 \times 10^{-4}$ | 1.8920 |
| 0.0400 | $3.86 \times 10^{-4}$ | 3.7840 |
| 0 | 0 | 0 (Control) |

EXAMPLE 21

A calcia stabilized zirconia doped with chromium oxide cell was prepared by the methods of Examples 1 and 2 from a calcia stabilized zirconia doped with chrome oxide powder produced as follows. An chromium solution was prepared by dissolving chrome metal powder (2.5 grams, Alfa Products Lot No. 113078) in a concentrated hydrobromic acid (40 ml). The solution was initially dark green. After stirring for 1 hour at room temperature, liquid bromine (5 ml) was added and the solution was heated for an additional two hours with stirring. The final solution is dark red. A solution of zirconium propoxide (349.92 ml) in concentrated nitric acid (122.5 ml) and a solution of calcium carbonate (13 grams) in concentrated nitric acid, were combined according to the method of Example 16 and aliquots of the combined solution added to the chromium solution according to TABLE X:

TABLE X $[(ZrO_2)_{0.87}(CaO)_{0.13}]_{1-x}[CrO]_x$

| x | Moles of Cr | Vol. of Cr Soln (ml) |
|---|---|---|
| 0.0001 | $2.32 \times 10^{-6}$ | 0.0023 |
| 0.0003 | $6.96 \times 10^{-6}$ | 0.0069 |
| 0.0100 | $2.32 \times 10^{-5}$ | 0.0232 |
| 0.0300 | $6.96 \times 10^{-5}$ | 0.0696 |
| 0.0100 | $2.32 \times 10^{-4}$ | 0.2320 |
| 0 | 0 | 0 (Control) |

EXAMPLE 22

A yttria stabilized zirconium cell prepared by the method of Example 1 was provided with silver/platinum electrodes formed by electrolylessly plating individual layers of silver and platininum and firing the resulting cell to approximately 800° C. for one hour. The cell was heated to 740° C. in a Lindberg tube furnace for one hour. An argon stream containing NO was passed through the hot cell at open circuit (no current). No ammonia was detected in the outlet or inlet stream as determined with a 21 meter optical cell in a FT-IR. Maintaining the cell at open circuit, hydrogen gas was spiked into the gas outlet and again, no ammonia could be detected. The cell was then connected to a DC power supply and the interior of the cell was held at approximately 2.4 V cathodic with respect to a platinum/air reference electrode. The FT-IR spectra of the gas effluent from the cell showed that ammonia was being synthesized.

EXAMPLE 23

Using the cell and procedure of Example 22, water vapor was spiked into the gas stream instead of hydrogen. The FI-IR spectra of the gas effluent from the cell showed that ammonia was being synthesized.

EXAMPLE 24

Using the cell of procedure of Example 22, $N_2O$ was substituted as an alternative feed gas for NO. the FI-IR spectra of the gas effluent from the cell showed that ammonia was being synthesized.

EXAMPLE 25

Using the cell and procedure of Example 23, water vapor was spiked into the gas stream instead of hydrogen. The FI-IR spectra of the gas effluent from the cell showed that ammonia was being synthesized.

As seen from the above examples, ammonia can be generated by the present invention regardless of the particular nitrogen oxide contained in the feedstream, and regardless of whether hydrogen gas or inexpensive water vapor is used as a source of hydrogen atoms. Thus the present invention is useful not only in removing toxic or unwanted components from a fluid stream, but is also useful for generating usable by products of the fluid stream treatment, such as ammonia. It will be understood that similarly, carbon particles or some or all of the oxygen atoms in carbon containing components of a fluid stream, such as CO, $CO_2$, $C_xH_yO_z$ can be replaced by hydrogen by the present invention to produce, for example, methane.

EXAMPLE 26

To independently verify the electrochemical data, direct gas-phase FT-IR measurements were mode on the $NO_x$ and $SO_2$ content of gas streams passed through cells of this invention both before and after passage of the fluid stream through the reactor or scrubber cell. Intially, the reactor cell was bypassed and a room temperature gas stream was passed directly into the FT-IR optical cell, thus establishing the baseline spectrum. As a control, the gas stream was routed through a hot reactor cell under open circuit conditions (with no electrical current flowing through the cell) and verified that there were no observable alterations in the $NO_x$ or $SO_2$ content due to catalytic, thermal or miscellaneous effects. A DC voltage was then applied to the reactor with no other changes in the set-up, and the gaseous effluent again analyzed and found to have a lessened NO and/or $SO_2$ concentration. At operating temperatures of 400° C., the gas-phase IR spectrophotometric measurements showed that the cell of the present invention decreased NO concentrations by approximately 85–90% and $SO_2$ concentrations by 100%. At operating temperatures of 500° C., the concentrations of both gased in the effluent stream had been reduced to essentially zero. Neither compound was present at concentrations above the detection limits of the Fourier-transform IR using a 21 meter optical path lenghth gas cell.

The following examples illustrate the reactor sizing for various applications.

EXAMPLE 27

The reactor sizing for a 100 MW natural gas fired boiler is calculated as follows from the following input values: 250 ppm NO; 450±50° C. flue gas temperature (before air preheaters or economizers); fuel, natural gas (approximated by $CH_4$ @ 210 KC/mole. The overall chemical equation for the combustion process is:

$$CH_4 + 2O_2 + 8N_2 = CO_2 + 2H_2O + 8N_2 + 210 \text{ KC Enthalpy}$$

For each 1 MW (megawatt) of thermal input:

$$1 \text{ MW} = 1 \times 10^{+6} W$$
$$= 2.39 \times 10^{-5} \text{ calories/second}$$
$$= 1.14 \text{ moles } CH_4/\text{second}$$
$$= 12.5 \text{ moles of exhaust gas/second}$$
$$= 3.13 \times 10^{-3} \text{ moles of NO/second}$$
$$= 0.188 \text{ moles of NO/minute}$$
$$= 12.5 \times 10^{-3} \text{ cm}^3 \, (n/M \times \text{cm}^3 = 15 \times 16^{-6} @ 1V)$$

Therefore, a reactor volume of approximately 12.5 liters is required for each 1 MW of boiler thermal input. This is equivalent to a 1.6 cm thick section of flue gas piping approximately 1 meter in diameter. Accordingly, a 1.25 cubic meter reactor would be required for a 100 MW natural gas fired boiler.

EXAMPLE 28

The power required to operate a reactor of the present invention may be calculated as follows:

$$P = V \times A = (0.5 \pm 0.5) \times A =$$
$$(0.5 \pm 0.5) \times (F \times 2 \times 3.13 \times 10^{-3} \text{ moles NO/sec/1MW}) =$$
$$0 - 0.6 \text{ kW/1MW}$$

Accordingly, it is estimated that approximately 0-0.1% of the input thermal energy of the boiler is required to operate the scrubber of the present invention. Competing technologies require at least 50 times more power.

EXAMPLE 29

The sizing for a reactor or scrubber cell of the present invention for a 25 MW natural gas fired turbine producing 500 ppm NO may be calculated as follows. Fitting the appropriate data as a function of temperature to a simple first order expotential equation, the energy of activation is calculated to be approximately 13-15 KC/mole, corresponding to a doubling of the rate of $NO_x$ removal for every 100° C. of temperature increase. If the reactor unit or scrubber assembly is placed in or near the combustion zone of the natural gas fired turbine at a nominal temperature of 1750° C., the value of $n/Mxcm^3$ increases to approximately $200 \times 10^{-6}$ (at a nominal NO pressure of $256 \times 10^{-6}$ atmospheres). Lineally adjusting this value to the VTR (volumetric turnover rate) to a nitric oxide partial pressure of $2000 \times 10^{-6}$, (the subsequent cooling air input lowers this value at the stack to a nominal 500 ppm NO) results in an order of magnitude estimate of the application VTR of $l/n/m/cm^3$.

Accordingly, for each 1 MW of gas turbine thermal input:

$$1 \text{ MW} = 12.5 \text{ moles exhaust gas/second}$$
$$= 2.5 \times 10^{-2} \text{ moles NO/second}$$
$$= 1.50 \text{ moles NO/minute}$$
$$= 1.5 \text{ cm3 } (n/m \times \text{cm}^3 = 1)$$

Therefore, based on available data, a reactor volume of approximately 150 cm³ (9 in³) would be required to process the $NO_x$ output of a 25 MW natural gas fired turbine. The power consumption of this application is calculated according to Example 28, and is similar to boiler power consumption, or approximately 0-0.1% of the input thermal power of the turbine.

Turning again to the drawings, FIG. 13 is a molecular scale schematic three phase format depicting the relationships at the molecular level of the gas, the electrolyte and the electronic conductor. The molecule of nitric oxide has a dipole moment and tends to align itself with the oxygen atoms contacting the electrolyte. The aligned gas molecule of nitric oxide accepts 2 electrons forming a kinetic intermediate. This species then rearranges by dissolving the oxygen atoms into the electrolyte as an $O^{-2}$ ion, thus accounting for the 2 electrons injected by the electronic phase into the gas molecule. The nitrogen atom subsequently reacts with a second nitrogen atom to form gas phase $N_2$. The dissolved $O^{-2}$ ion transports to the anode where it deposits its two electrons back into the electronic circuit (electrons are transported but always conserved). The oxygen atom combines with a second oxygen atom to form gas phase $O_2$. The process requires the physical juxtaposition of all three phases at essentially the same moment in time.

Figure 20:
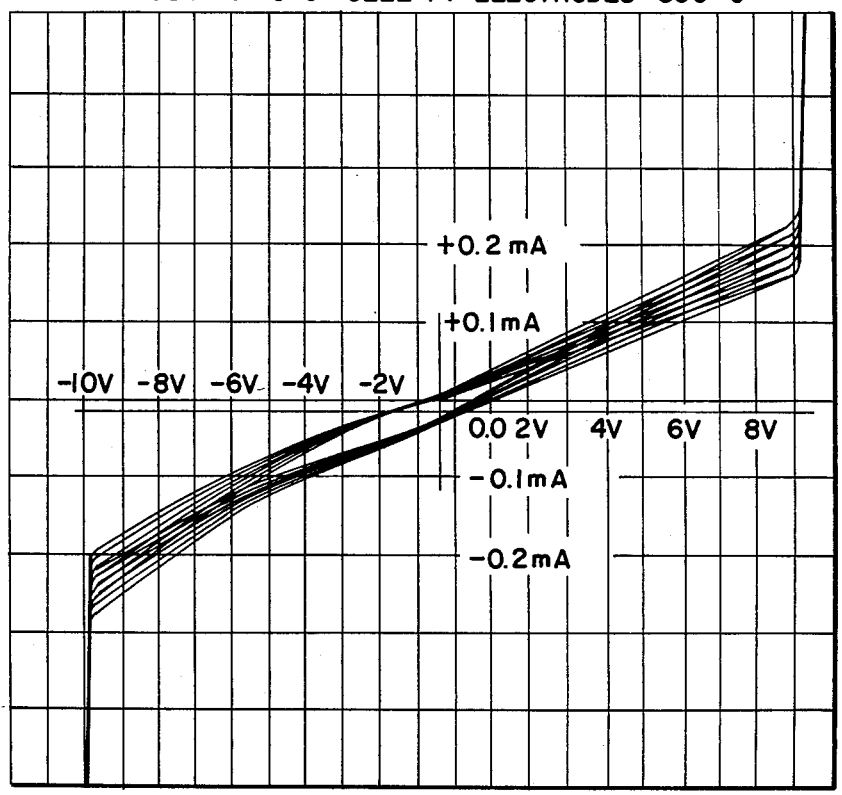
FIG. 20 is a cyclic voltammogram of the 1% chromium oxide/calcia stabilized zirconica cell of Example 21.

FIG. 14 is a molecular scale schematic two phase format using $SO_2$ in place of NO. The electrolyte phase is ceria stabilized gadolinia ($Ce_{0.82} Gd_{0.18} O_2$) wherein the region in contact with the gas phase is a mixed conductor, that is, it is both ionically ($O^{-2}$) conductive and electronically ($e^-$) conductive. This means its transfer number is less than unity. This mixed conductor status may preferably be achieved by altering the composition of the surface such as by doping with iron, chrome, etc. The two phase format requires only gas/solid contact, not the three phase contact of the example graphically depicted in FIG. 13. FIG. 20 graphically depicts the electrochemical behavior of a 2-phase material.

Figure 15:
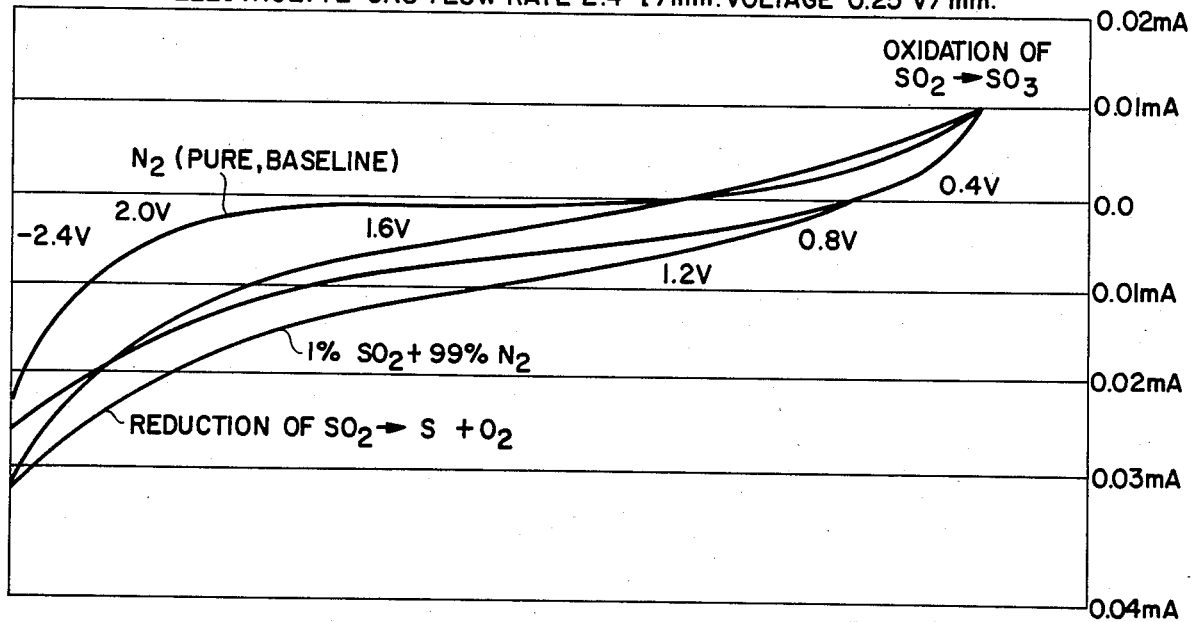
FIG. 15 is a cyclic voltammogram for sulfur dioxide removal by reduction and oxidation using the calcia stabilized zirconium cell of Example 16.

FIG. 15 is a graph of a cyclic voltammogram of a calcia stabilized zirconia cell with a nitrogen flowing gas stream or the same stream spiked with 1% $SO_2$. The horizontal axis is the voltage vs an air/noble metal reference and the vertical axis is the current passed through the cell. The current above the voltage axis corresponds to the oxidation of $SO_2$ to $SO_3$, while the current below the horizontal axis moves in the opposite direction and corresponds to the reduction of $SO_2$ to S. The curve crosses the voltage line (i.e. no current)) at approximately the thermodynamic voltage anticipated for $SO_2$. The total flow rate of the gas stream was 2.4 l/minute and the voltage sweep rate 0.25 V/minute. As can be seen from the graph, not only does the present invention handle $SO_2$, but one can elect to selectively oxidize and reduce noxious gases.

Figure 16:
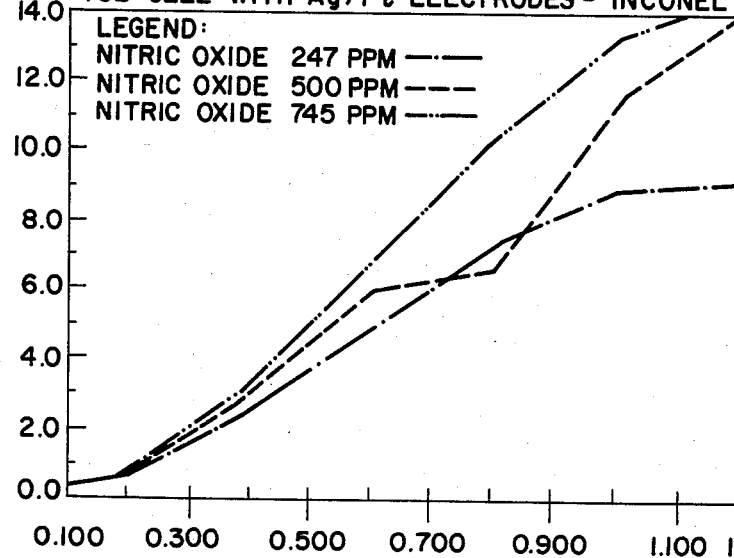
FIG. 16 is a graphic depiction of voltage vs. ionic current of the yttria stablized zirconia cell of Example 2 having silver/platinum electrode connectors plates thereon, operating at 450° C. at varying concentrations of nitric oxide.

FIG. 16 graphically demonstrates the performance of a cell of the present invention operating at 450° C., using silver/platinum electrodes and polished Inconel 601 end seals and shows the relationship between voltage vs. ionic current. The vertical axis is the ionic current and the horizontal axis is the voltage. The gas passing through the cell was argon spiked with 247 ppm, 500 ppm or 745 ppm of nitric oxide (NO). The higher the voltage, the greater the current, i.e., the greater the efficiency. It was also noted that current increased as a function of NO content, that is, the greater the NO content, the greater the current.

Figure 17:
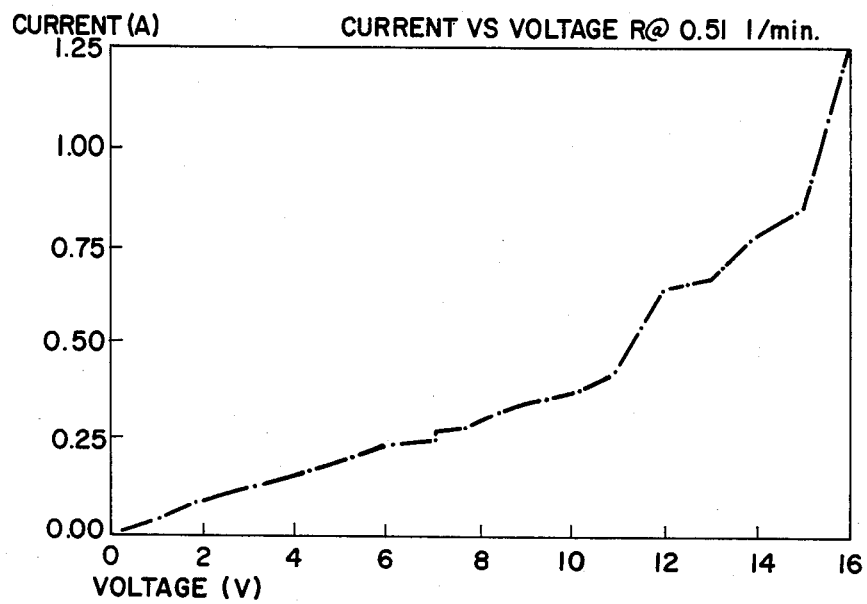
FIG. 17 is a graphic depiction of current v. voltage of the cell of Example 2, operating at 500° C. in an air stream having a flow rate of 0.5 liter/minute.

FIG. 17 graphically depicts the current/voltage relationship of a cell of the present invention in operation with a feedgas of air and an electrolyte of yttria stabilized zirconia and silver/platinum electrodes. Normally, one would only use the first 0–3 volts. The gas flow rate was 0.50 liters/minute.

Figure 18:
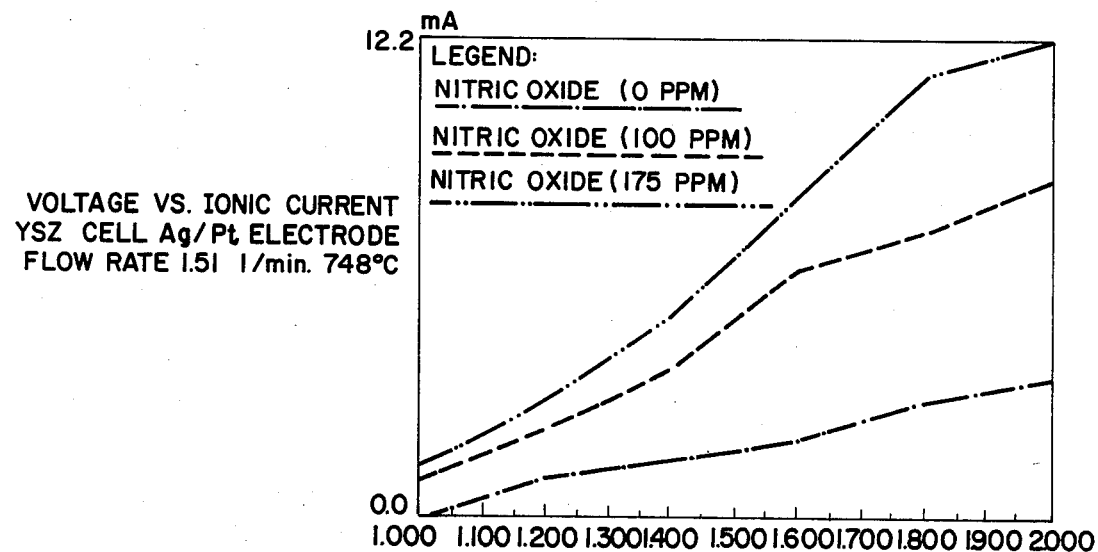
FIG. 18 is a graphic depiction of voltage vs ionic current of a yttria stabilized zirconium cell having silver/platinum electrode connectors plated thereon, operating at 748° C. with a nitric oxide stream flow rate of 1.5 liters/minute.

FIG. 18 graphically depicts the voltage vs. ionic current relationship of a yttria stabilized zirconia cell of this invention, with silver/platinum electrodes, operating at 748° C. with gas stream NO content of 0, 100 and 175 ppm.

Figure 19:
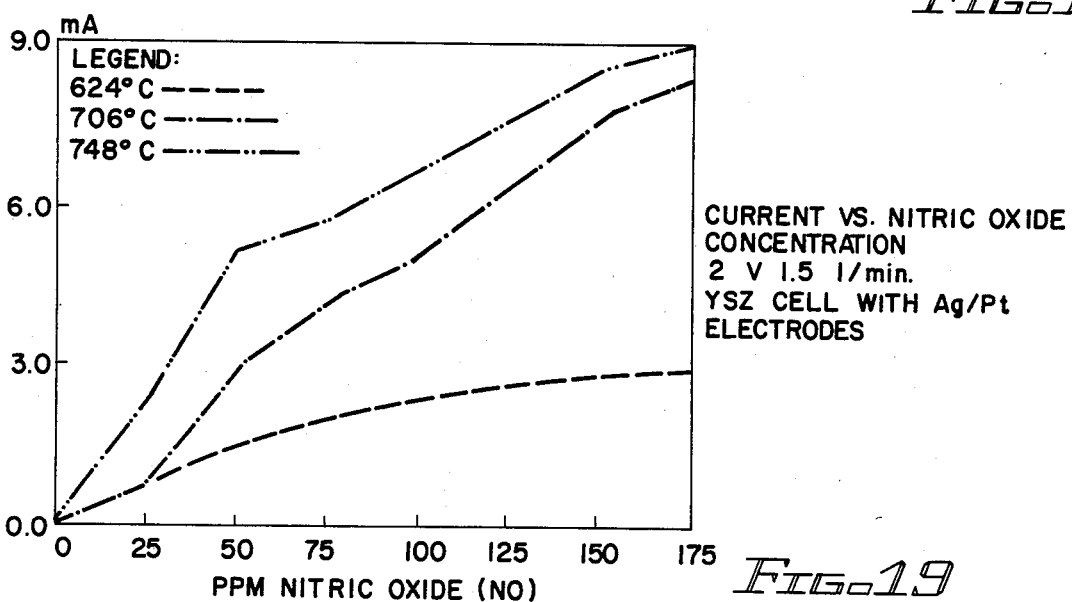
FIG. 19 is a graph of current v. nitric oxide concentration of yttria stabilized zirconia cell of Example 3.
Figure 21:
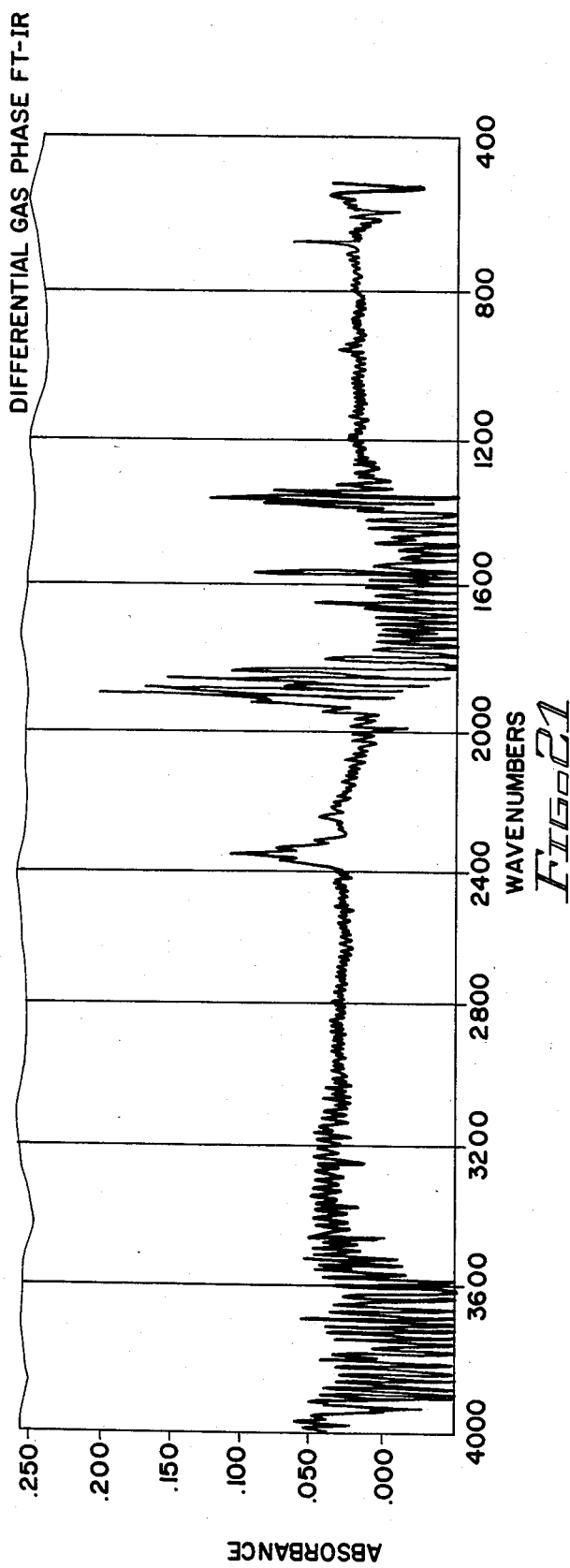
FIG. 21 is a differential gas-phase infared spectrum of NO and $SO_2$ after passage through the yttria-stabilized zirconia cell of Example 2.
Figure 24:
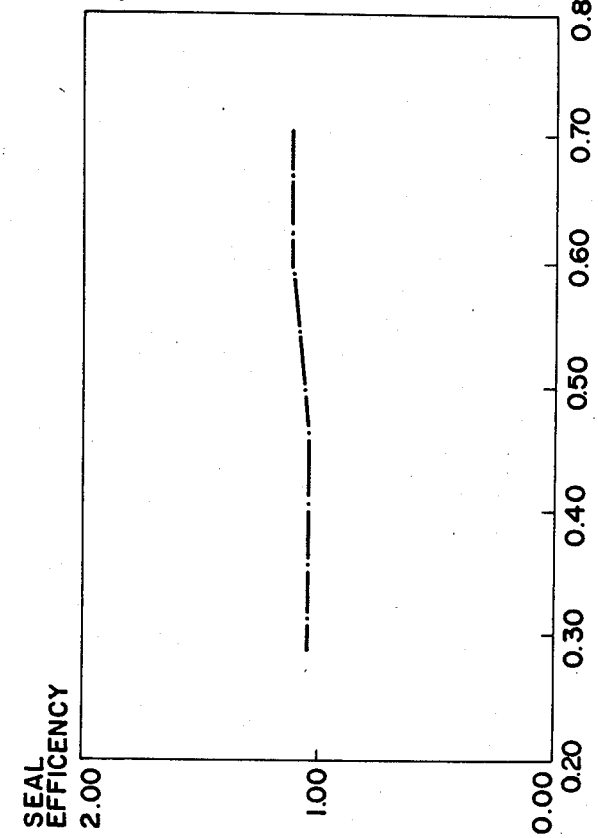
FIG. 24 is a graph of the seal efficiency vs. flow rate of the yttria stabilized zirconia cell of Example 1 at 400° C.

FIG. 19 is similar to FIG. 16, except the horizontal axis is ppm NO, measured at a constant 2 V. Each of these three curves is at a different temperature ranging from 624° C. to 748° C., using a yttria stablized zirconia cell of Example 1 with silver/platinum electrodes, and a gas stream flow rate of 1.50 liters per minute.

FIG. 20 is a cyclic voltammogram of the 1% chrome doped calcia stabilized zirconia cell of example 21. In this case, the cell was a disc cut from a calcia stabilized zirconia tube (0.25" i.d. $\times$ 0.375" o.d.) having the center hole thereof filled with a sintered ceramic plug of the chrome oxide doped calcia stabilized zirconia. One electrode was placed on the exterior calcia stabilized zirconia wall of the cell, while the other electrode was placed on the specially formulated sintered plug. Thus, the current measured must travel through both the plug material and the calcia stabilized zirconia material. While the plug will carry both electronic and ionic current, the neat calcia stabilized zirconia will carry only ionic current. Thus, the electronic current is essentially "blocked" at the neat calcia stabilized zirconia phase, and the only current measured is due to the ionic (gas redox mediated) activity. This arrangement eliminates any short circuiting phenomena. The two ceramic phases were intentionally chosen to be nearly identical, to match the thermal and other coefficients as closely as possible. Otherwise the processing of the ceramic and its subsequent thermal cycling would be seriously restricted. The electrodes were porous, electroless deposited platinum, and the cell was operated at a temperature of 850° C. Each sweep of the voltage increases the ionic current which is caused by the lowering of the transference number of the plug material, resulting in a greater rate, per $cm^2$ of active area, of gas oxidation and reduction.

In FIG. 22, the percent transmittance (%T) vs wave number is shown in graphic form, illustrating the spectra of $N_2O$ which has been thermally rearranged. This figure shows the spectra of the gas effluent from the hot cell with the current off (open circuit). The major absorption is $N_2O_4$ at about 1350 wavenumbers. The optical path length of the IR measurement cell in this measurement was 5 mm which is much too short to show any NO which may have additionally been present. $N_2$ and $O_2$ do not have any absorbance in the IR spectrum. Note that the %T of the $N_2O_4$ peak is about 65%.

FIG. 23 is a sister graph of FIG. 22, with the current flowing. The $N_2O_4$ peak is absent, evidencing that 100% of that noxious gas stream component was removed.

It will be apparent to one skilled in the art that the present invention constitutes a major advance in the art, as it not only provides superior reactor or scrubber cell assemblies which efficiently and economically remove noxious components such as NO, $N_2O$, $N_2O_4$, $SO_2$ and the like from a fluid stream, regardless of size, but further provides a means of converting noxious components in fluid streams to commercially useful materials such as ammonia and methane gas.

Although embodiments of the invention have been shown and described, it is to be understood that various modifications and substitutions, as well as various additions, rearrangements and combinations of process steps, can be made by those skilled in the art without departing from the spirit and scope of the invention.

The invention claimed is:

1. A solid electrochemical cell adapted to alter the composition of gas streams passing therethrough comprising: a porous, high surface area body, a high surface area, a porous solid electrolyte, the interior of which permits the passage of a gas stream therethrough, forming the body of the cell interior; a gas communicating passageway through the cell length; a first electronically conductive region and a second electronically conductive region, said regions disposed in electronically opposing segments of the cell; a first electrode connection member located in said first conductive region and a second opposing electrode connector member located within said second conductive region.

2. The device of claim 1 additionally comprising a first seal member positioned at said first sealable end portion of said cell in fluid tight communication therewith, and a second seal member positioned at said second sealable end portion of said cell in fluid tight communication therewith, each of said seal members having a first end which is positioned in fluid tight communication with the cooperating cell end and a second end in fluid tight communication with a gas stream exhaust conduit.

3. The device of claim 1 wherein said porous, high surface area, solid electrolyte is a metal oxide.

4. The device of claim 1 wherein said porous high surface area, solid electrolyte is a stabilized metal oxide.

5. The device of claim 4 wherein said stabilized metal oxide is yttria stabilized zirconia.

6. The device of claim 4 wherein said stabilized metal oxide is calcia stabilized zirconia.

7. The device of claim 4 wherein said stabilized metal oxide is gadolinia stabilized ceria.

8. The device of claim 4 wherein said stabilized metal oxide is erbia stabilized bismuth sesqaoxide.

9. The device of claim 4 wherein said stabilized metal oxide is yttria stablized thoria.

10. The device of claim 4 wherein said stabilized metal oxide is magnesia stabilized zirconia.

11. The device of claim 1 wherein said porous, high surface area, solid electrolyte is a metal oxide selected from the group consisting of an oxide of zirconium, hafnium, titanium, calcium, magnesium, cerium, bismith, samarium, yttrium, scandium, gadolinium, lanthinum, erbium, praseodimium, perskovytes, pyrochlores and molybdenum.

12. A dry, solid state electrochemical scrubber assembly adapted for use in a gaseous combustion exhaust stream containing noxious components comprising;
- a cell having a high surface area, porous solid electrolyte body, permitting the passage of said exhaust stream therethrough, said body having a first end, a second end, and an outer surface;
- an upstream sealing member in fluid tight communication with said first end of said cell and with an upstream portion of an exhaust conduit;
- a downstream sealing member in fluid tight communication with said second end of said cell and with a downstream portion of said exhaust conduit;
- a first discrete conductive area disposed on a portion of said cell surface;
- a second discrete conductive area disposed on a portion of said cell surface;
- a first electrode connector cooperating with said first discrete conductive area;
- a second electrode connector cooperating with said second discrete conductive area; and
- first and second electrodes cooperating with said electrode connectors and an alternating or direct current source.

13. The scrubber assembly of claim 12 wherein said first and second end portions of said cell form hubs adapted to mate in fluid tight engagement with opposing socket seal ends of said seal members.

14. The scrubber assembly of claim 13 wherein said seal members include shoulder members which cooperate with said hub ends of the cell to form a fluid tight seal.

15. The scrubber assembly of claim 13 wherein said cell end hubs are conical.

16. The scrubber assembly of claim 12 wherein said porous, high surface area, solid electrolyte is a metal oxide electrolyte.

17. The scrubber assembly of claim 16 wherein said metal oxide electrolyte is selected from the group consisting of zirconia, hafnia, titania, ceria, yttria, scandia, calcia, gadolinia, and bismuth oxide.

18. The scrubber assembly of claim 16 wherein said metal oxide electrolyte is a stabilized metal oxide electrolyte.

19. The scrubber assembly of claim 18 wherein said stabilized metal oxide electrolyte is yttria stabilized zirconia.

20. The scrubber assembly of claim 18 wherein said stabilized metal oxide is calcia stabilized zirconia.

21. The scrubber assembly of claim 18 wherein said stabilized metal oxide is ceria stabilized zirconia.

22. The scrubber assembly of claim 18 wherein said stabilized metal oxide is gadolinium stabilized ceria.

23. The scrubber assembly of claim 18 wherein said stabilized metal oxide is erbia stabilized bismth sesqaoxide.

24. The scrubber assembly of claim 18 wherein said stabilized metal oxide is yttria stabilized thoria.

25. The scrubber assembly of claim 18 wherein said stabilized metal oxide is magnesia stabilized zirconia.

26. A solid state electrochemical ceramic cell adapted to alter the composition of a fluid stream containing noxious component passing therethrough comprising: a porous, high surface area body having a gas-receiving first end seal portion, a gas egressing second end seal portion and substantially gas impervious side walls defining the length of the cell; a high surface area, porous solid electrolyte forming the body of cell interior, permitting the passage of fluid stream therethrough, a first sealable end portion adapted to communicate in fluid tight engagement with an gas stream ingress conduit, a second, spaced-apart end portion adapted to communicate in fluid tight engagement with a gas stream egress conduit, a gas communicating passageway through the cell length extending from the first sealable end portion through the second sealable end portion and adapted to carry gas through the length of the cell; a first electronically conductive region and a second electronically conductive region, said regions disposed in electronically opposing segments of the cell; a first electrode connection member located in said first conductive region and a second opposing electrode connection member located within said second conductive region; said cell end portions adapted to be positioned in gas-tight engagement with conduit means which deliver and remove a gas stream to be treated to and from the cell.

27. The device of claim 26 additionally comprising a first seal member positioned at said first sealable end portion of said cell in fluid tight communication therewith, and a second seal member positioned at said second sealable end portion of said cell in fluid tight communication therewith, each of said seal members having a first end which is positioned in fluid tight communication with the cooperating cell end and a second end in fluid tight communication with a gas stream exhaust conduit.

28. The device of claim 26 wherein said porous, high surface area, solid electrolyte is a metal oxide.

29. The device of claim 26 wherein said porous high surface area, solid electrolyte is a stabilized metal oxide.

* * * * *